(12) United States Patent
Berbee et al.

(10) Patent No.: US 10,730,973 B2
(45) Date of Patent: *Aug. 4, 2020

(54) ETHYLENE-BASED POLYMERS WITH LOW HEXANE EXTRACTABLES AND LOW DENSITIES

(71) Applicant: Dow Global Technologies LLC, Midland, MI (US)

(72) Inventors: Otto J. Berbee, Hulst (NL); Cornelis F. J. Den Doelder, Terneuzen (NL); Stefan Hinrichs, Wondelgem (BE); Teresa P. Karjala, Freeport, TX (US); John O. Osby, Freeport, TX (US)

(73) Assignee: Dow Global Technologies LLC, Midland, MI (US)

( * ) Notice: Subject to any disclaimer, the term of this patent is extended or adjusted under 35 U.S.C. 154(b) by 21 days.

This patent is subject to a terminal disclaimer.

(21) Appl. No.: 15/737,474

(22) PCT Filed: Jun. 16, 2016

(86) PCT No.: PCT/US2016/037809
§ 371 (c)(1),
(2) Date: Dec. 18, 2017

(87) PCT Pub. No.: WO2016/209706
PCT Pub. Date: Dec. 29, 2016

(65) Prior Publication Data
US 2019/0002606 A1    Jan. 3, 2019

Related U.S. Application Data

(60) Provisional application No. 62/184,494, filed on Jun. 25, 2015.

(51) Int. Cl.
*C08F 110/02* (2006.01)
*C08F 2/38* (2006.01)
*C08F 4/38* (2006.01)

(52) U.S. Cl.
CPC ................... *C08F 110/02* (2013.01)

(58) Field of Classification Search
USPC .......................................... 526/64
See application file for complete search history.

(56) References Cited

U.S. PATENT DOCUMENTS

| 3,334,081 A | 8/1967 | Madgwick et al. |
| 3,654,253 A | 4/1972 | Steigerwald et al. |

(Continued)

FOREIGN PATENT DOCUMENTS

| DE | 276598 A3 | 3/1990 |
| WO | 97/45465 A1 | 12/1997 |

(Continued)

OTHER PUBLICATIONS

Goto, Journal of Applied Polymer Science, Applied Polymer Symposium, vol. 36, Jan. 1, 1981, pp. 21-40.

*Primary Examiner* — Fred M Teskin
(74) *Attorney, Agent, or Firm* — Quarles & Brady LLP

(57) ABSTRACT

Ethylene-based polymers comprising the following properties: (A) a density less than 0.9190 g/cc; (B) a hexane extractable level that meets the following equation: hexane extractable level ≤A+B [log(I2)], where A=2.65 wt %, and B—0.25 wt %[log (dg/min)]; based on total weight of the ethylene-based polymer; (C) a G' (at G''=500 Pa, 1 70° C.) that meets the following equation: G'≥C+D [log(I2)], where C=150 Pa, and D=−60 Pa/[log(dg/min)]; and (D) a melt index (I2) from 0.7 to 20 dg/min; are made in high pressure tubular process that comprises at least three reaction zones with the peak polymerization temperature of the first reac- (Continued)

for Inventive 8 tion zone ≥320° C. and the peak polymerization temperature of the last reaction zone ≤290° C.

18 Claims, 5 Drawing Sheets

(56) References Cited

U.S. PATENT DOCUMENTS

| | | | |
|---|---|---|---|
| 3,917,577 A | | 11/1975 | Trieschmann et al. |
| 4,135,044 A * | | 1/1979 | Beals .................. C08F 110/02 |
| | | | 526/352.2 |
| 4,916,255 A | | 4/1990 | Kobayashi et al. |
| 5,539,075 A | | 7/1996 | Gustafsson et al. |
| 6,569,962 B1 | | 5/2003 | Zschoch et al. |
| 7,820,776 B2 | | 10/2010 | Neuteboom et al. |
| 10,358,512 B2 * | | 7/2019 | Hinrichs .................. C08F 2/001 |
| 2002/0052455 A1 | | 5/2002 | Hogt et al. |
| 2003/0114607 A1 | | 6/2003 | Donck |
| 2004/0214971 A1 | | 10/2004 | Gonioukh et al. |
| 2008/0242809 A1 | | 10/2008 | Neuteboom et al. |
| 2009/0234082 A1 | | 9/2009 | Neilen et al. |
| 2010/0060244 A1 | | 3/2010 | Kurokawa et al. |
| 2011/0052525 A1 | | 3/2011 | Grunewald et al. |
| 2012/0059469 A1 | | 3/2012 | Myers et al. |
| 2013/0197168 A1 | | 8/2013 | Berbee et al. |
| 2013/0237678 A1 | | 9/2013 | Osby et al. |
| 2013/0295289 A1 | | 11/2013 | Littmann et al. |
| 2013/0333832 A1 | | 12/2013 | Vittorias et al. |
| 2014/0275427 A1 | | 9/2014 | Nummila-Pakarinen et al. |
| 2014/0288257 A1 | | 9/2014 | Zschoch et al. |
| 2014/0316094 A1 | | 10/2014 | Berbee et al. |
| 2014/0316096 A1 | | 10/2014 | Berbee et al. |
| 2015/0031843 A1 | | 1/2015 | Hjertberg et al. |
| 2015/0038655 A1 | | 2/2015 | Magnusson et al. |
| 2015/0073104 A1 | | 3/2015 | Uematsu et al. |
| 2015/0111053 A1 | | 4/2015 | Nummila-Pakarinen et al. |
| 2015/0133616 A1 | | 5/2015 | Sultan et al. |
| 2015/0197590 A1 | | 7/2015 | Osby |
| 2015/0210785 A1 | | 7/2015 | Nummila-Pakarinen et al. |
| 2015/0274856 A1 | | 10/2015 | Berbee et al. |
| 2015/0344599 A1 | | 12/2015 | Osby et al. |
| 2016/0115256 A1 | | 4/2016 | Berbee et al. |
| 2016/0137822 A1 | | 5/2016 | Den Doelder et al. |
| 2016/0297904 A1 * | | 10/2016 | Berbee .................. C08F 210/02 |
| 2017/0166668 A1 | | 6/2017 | Duchateau et al. |

FOREIGN PATENT DOCUMENTS

| | | | | |
|---|---|---|---|---|
| WO | WO 2013/078018 A2 * | 5/2013 | ............. | C08L 23/06 |
| WO | WO 2013/078224 A1 * | 5/2013 | ............... | C08F 2/00 |

* cited by examiner

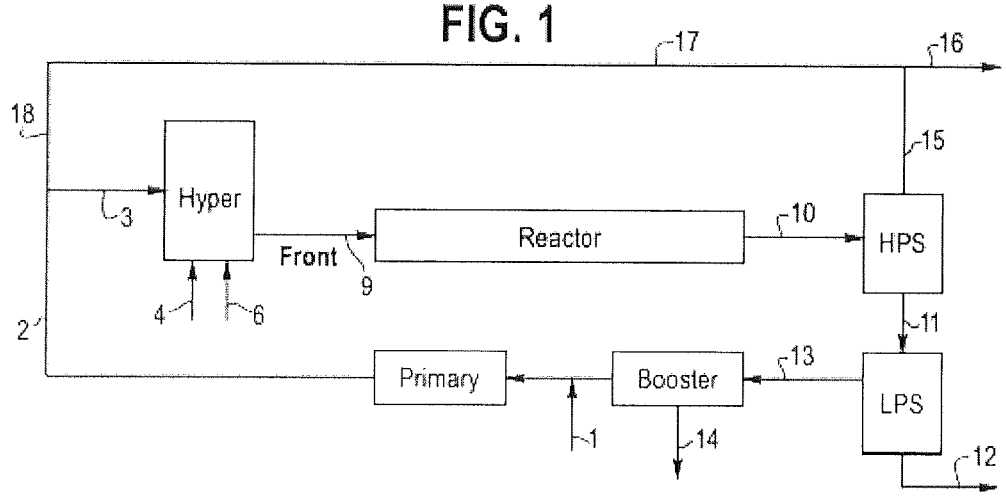
Flow Scheme for Comparative 1 and 2 and Inventive 9
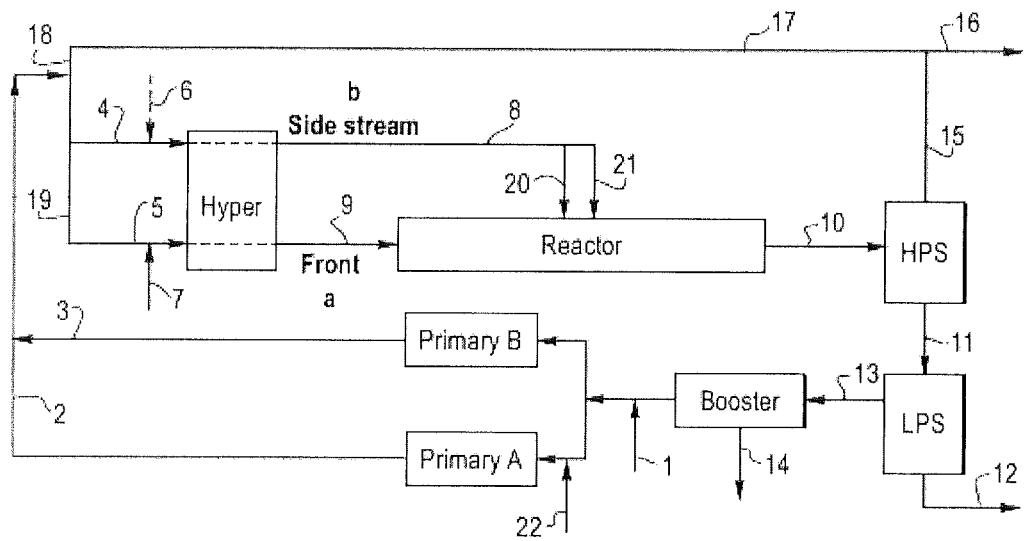
for Inventive 1 and 2 for Inventive 3 to 6 for Inventive 7 for Inventive 8 for Comparative 15 for Comparative 6, 10 to 13 and 16 for Comparative 7, 14, and 17 for Comparative 3 to 5, 8 and 9

ETHYLENE-BASED POLYMERS WITH LOW HEXANE EXTRACTABLES AND LOW DENSITIES

This application claims the benefit of U.S. Provisional Application No. 62/184,494, filed on Jun. 25, 2015, incorporated herein by reference.

BACKGROUND

Resins for extrusion coating on paper, board, aluminum etc., require broad MWD (molecular weight distribution) and low extractables. In extrusion coating applications the polymer is processed at high temperature conditions, typically above 280° C. and below 350° C. Broad molecular weight distribution (MWD) resins with a very high molecular weight fraction are used for good processability during coating (neck-in and drawdown balance). Low extractables are needed to reduce undesirable taste and odor issues in the final product, and to reduce smoke formation during the processing of the resin, especially during coating processes.

Typically low density polyethylene (LDPE) resins with broad MWD are made using autoclave reactors or a combination of autoclave and tube reactors. Broad MWD resins can be achieved in autoclave reactors by promoting long chain branching, and through the inherent residence time distribution, by which molecules will undergo shorter (low molecular weight) or longer (high molecular weight) growth paths. Broad MWD autoclave resins for LDPE are dominantly focused in two product density regimes, namely from 0.915 to 0.919 g/cc and from 0.919 to 0.924 g/cc. The invention in this document describes improved broad MWD tubular reactor products designed for the lower densities up to 0.919 g/cc.

The autoclave and tubular reactor systems differ in residence time distribution, which is typically more uniform for tubular reactors and dispersed for autoclave reactors. The uniform residence time in tubular reactors leads to narrower MWD; therefore very broad MWD can only be achieved by applying extremely differentiated polymerization conditions (e.g., WO 2013/078018), and/or application of a branching/cross-linking agent (e.g., U.S. Pat. No. 7,820,776). The use of extreme process conditions and/or branching/cross-linking agents can lead to high melt strength tubular low density polyethylene suitable for extrusion coating applications; however with elevated extractables versus autoclave products. These tubular polyethylenes will have a specific composition (e.g. density), and functionality as determined by the applied process conditions, type and level of branching agent and/or comonomer. Undesirable gels in the polymer can be an issue, resulting from the use of branching or cross-linking agents. Due to the difference in cooling capability between the tubular and the autoclave process, the conversion level ranges typically from <20% for the autoclave to >30% for the tubular process. This large difference in conversion level has a major impact on operation costs as well on polymer output and power consumption (to compress ethylene) per unit of polymer.

The U.S. Food and Drug Administration (FDA) regulations prescribe two hexane extractable limits for polyethylene in contact with food, namely a maximum of 5.5 weight percent (wt %) for general food contact and a maximum of 2.6 wt % for cook-in food contact applications. The manufacture of low density polyethylene (LDPE) that has both a broad MWD and low hexane extractables, but that is also suitable for extrusion coating applications, is difficult. For LDPE made in a high pressure (e.g., greater than or equal to (≥) 100 MPa) polymerization that comprises at least one tubular reactor with multiple reaction zones, the small molecules that are formed in the last reaction zones do not propagate, i.e., form into larger molecules, and are thus prone to migrate out of the bulk polymer. Formation of these small molecules in the last reaction zones is to be avoided, or at least reduced, to reduce the hexane extractables.

Other ethylene-based polymers and polymerizations are disclosed in WO Nos. 2007/110127; 2012/057975, 2012/084787, 2013/078018; 2013/078224; 2013/178241; 2013/178242; 2013/149698; 2013/132011, 2013/083285, and 2014/003837; US 2008/0242809, and EP 2 681 250 B1. There remains a need for tubular ethylene-based polymers with a density below 0.9190 g/cc, a broad MWD, a high G', reduced extractable levels, and made at high ethylene conversion levels. These needs have been met by the following invention.

SUMMARY OF THE INVENTION

In one embodiment, the invention is an ethylene-based polymer formed from a free-radical, high pressure polymerization process that includes a reactor configuration comprising, as reactors, only one or more tubular reactors, said polymer comprising the following properties: (A) a density less than 0.9190 g/cc; (B) a hexane extractable level that meets the following equation: hexane extractable level ≤A+B[log (I2)], where A=2.65 wt %, and B=0.25 wt %/[log (dg/min)], based on total weight of the ethylene-based polymer; (C) a G' (at G"=500 Pa, 170° C.) that meets the following equation: G'≥C+D[log (I2)], where C=150 Pa, and D=−60 Pa/[log(dg/min)]; and (D) a melt index (I2) from 0.7 to 20 dg/min.

BRIEF DESCRIPTION OF THE DRAWINGS

FIG. 1 is a flow diagram for a LDPE process for Comp. Exs. 1 and 2 and Inv. Ex. 9.

FIG. 2 is a flow diagram for Inv. Exs. 1 and 2.

DETAILED DESCRIPTION

Figure 3:
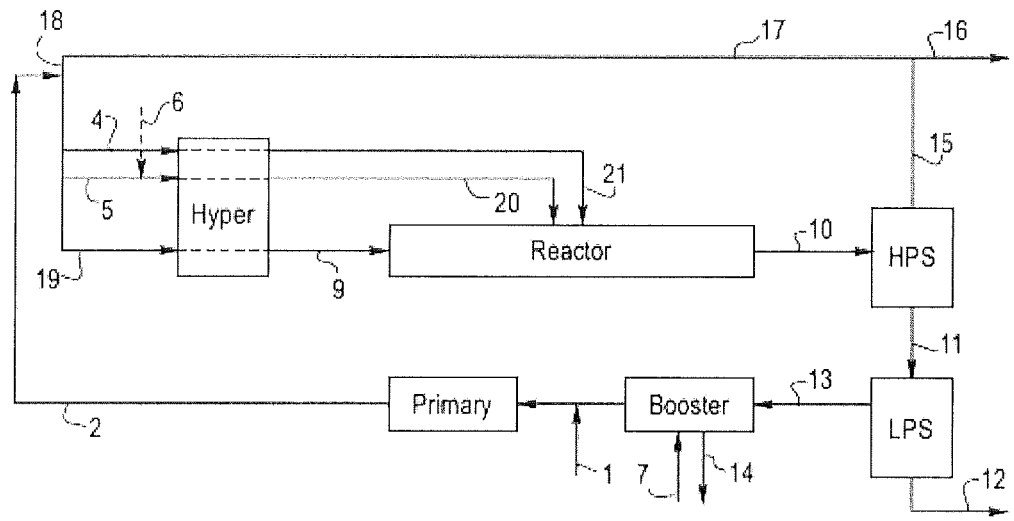
FIG. 3 is a flow diagram for Inv. Exs. 3 to 6.

Monomeric chain transfer agents (mCTAs) are compounds which contain a free radical polymerizable olefinic moiety, and a moiety capable of chain transfer, and which are connected by some form of linking group. Examples are shown in formulas i) through vi):

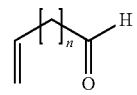

i)

where n=2 to 20;

ii)
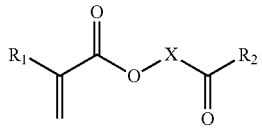

where R1 and R2 are independently H or Alkyl and where X is a C1 to C32 alkyl chain which is linear or branched;

iii)
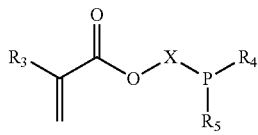

where R3, R4 and R5 are independently H or alkyl and where X is a C3 to C20 alkyl chain which is linear or branched;

iv)
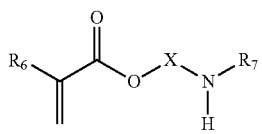

where R6 and R7 are independently H or alkyl and where X is a C2 to C20 alkyl chain which is linear or branched;

vi)
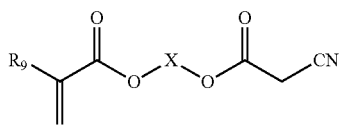

where R8 is independently H or alkyl and where X is a C2 to C20 alkyl chain which is linear or branched; and v)
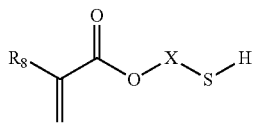

where R9 is independently H or Alkyl and where X is a C2 to C20 alkyl chain which is linear or branched.

The olefinic moiety is typically more reactive than ethylene in free radical polymerization and is preferably chosen from methacrylates, acrylates or allyl ethers. The chain transfer moiety is preferably defined as a group with a Cs value > than 0.01 (Table 1) and is preferably an aldehyde, ketone, mercaptan, phosphine, amine, or cyanoacetate.

As in WO 2012/084787, the functional group of the bi- or multifunctional comonomer, which has the highest probability of being incorporated into the growing chain, is an acrylate group, a methacrylate group, an amide group or a double bond, and preferably an acrylate group or a methacrylate group. The at least one functional group that can act as chain transfer agent but does not have the highest probability of being incorporated into the growing chain, is an aldehyde group, a ketone group, an alcohol group, a thiol group and certain double bonds. The functional groups are usually separated by a spacer group of at least one atom; for example, units —CH2- —Si(CH3)2- —CH2-O— and/or —Si(CH3)2-O—, or a chain of from 1 to 32, preferably from 1 to 22 and most preferably from 1 to 12 atoms. Examples of bi- or multifunctional comonomers (mCTAs) are compounds of general formula (I):

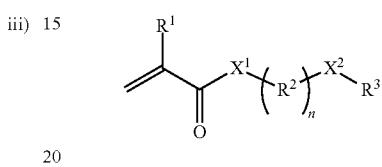

where $R^1$ is methyl or hydrogen; $X^1$ is —O— or —NH—, preferably —O—; $R^2$ can be identical or different, and is —CH2-, —Si(CH3)2- —CH2-O— or —Si(CH3)2-O—, and preferably all R2 are —CH2-; n is from 1 to 32, or from 1 to 22, or from 1 to 12; $X^2$ is —C(O)—, —CHOH— or —CHSH—, preferably —C(O)—; $R^3$ is alkyl (e.g., methyl) or hydrogen, and especially hydrogen; or the unit —$X^2$—$R^3$ stands for —CH=CH$_2$. Some structures a) thru f) are as follows:

a)
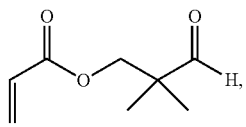

b)
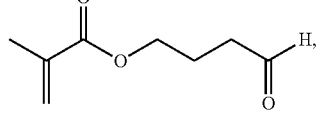

c)
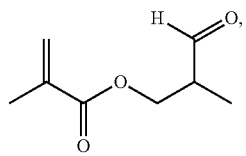

d)
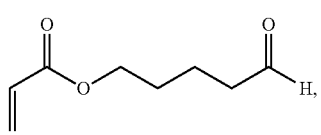

e)
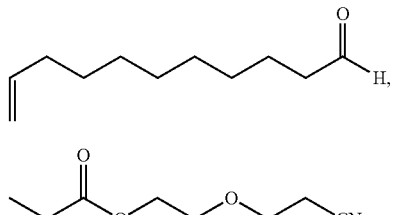

f)
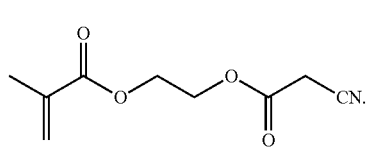

Polyenes are compounds which contain multiple (≥2) free radical polymerizable olefinic moieties connected by some form of inert linking group. These compounds can be symmetric (all polymerizable olefin ends (each terminal C═C bond) the same) or asymmetric. For symmetrical polyenes, the chemical nature of each terminal C═C double bond is the same, for example, acrylate, methacrylate, vinyl, allyl, etc. For example, formulas vii) thru xiii):

vii)

where t=2 to 20;

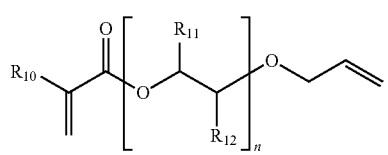

viii)

where R10, R11 and R12 are independently H or alkyl and where n is from 1 to 50;

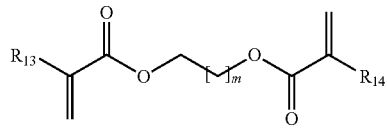

ix)

where R13 and R14 are independently H or alkyl and where m is from 1 to 50;

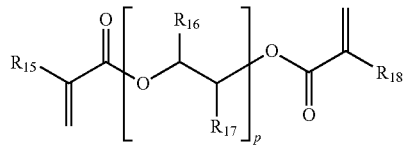

x)

where R15, R16, R17 and R18 are independently H or alkyl and where p is from 1 to 50,

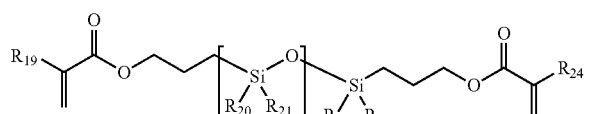

xi)

where R19, R20, R21, R22, R23 and R24 are independently H or alkyl and where r is from 1 to 1000.

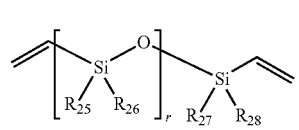

xii)

where R25, R26, R27 and R28 are independently H or alkyl and where v is from 1 to 1000.

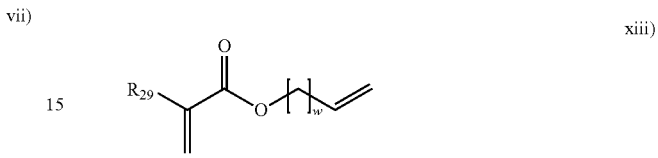

xiii)

where R29 is independently H or alkyl and w is from 1 to 20. Some specific structures n) through in) are as as follows:

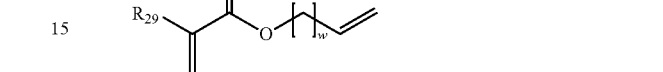

g)

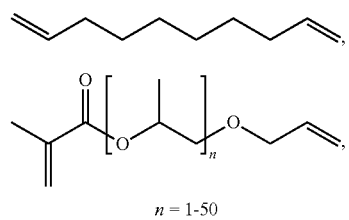

h)

$n = 1\text{-}50$

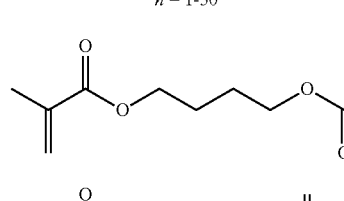

i)

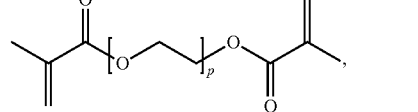

j)

$p = 1$ to $50$

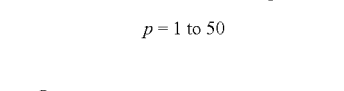

k)

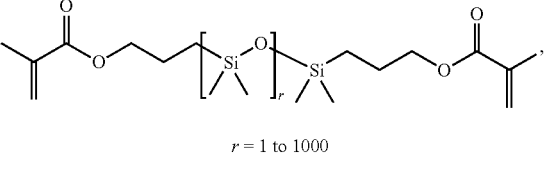

$r = 1$ to $1000$

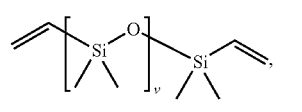

l)

$v = 1$ to $1000$

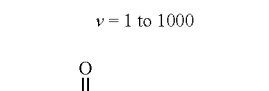

m)

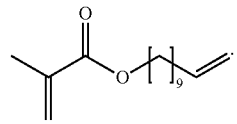

Typically a chain transfer agent is used in high pressure polymerization to regulate the molecular weight, by donating a hydrogen radical, by which an active radical at a growing polymer chain is terminated and a new active radical is formed at the remaining chain transfer agent molecule, which can build in monomer units. For a mCTA, the desired functionality of the chain transfer agent group is to initiate the formation of a T- or a Long Chain Branch (LCB) at an existing polymer molecule. Thus, it is important that the monomeric group has a high reactivity to ensure that preferably >90% of the mCTA is incorporated in the polymer structure. Once the mCTA is incorporated in the polymer structure, further reaction by the CTA functionality will lead to the formation of a T-branch. The unincorporated or free mCTA can still act as a classical CTA and start new molecules. It is important that the reactivity parameters r1 and r2, describing the reactivity of the monomeric group, are respectively ≤0.25 and ≥4.00.

The following show examples of T-branch and H-branch formation in the polymer using, respectively, a mCTA and a polyene. In one embodiment, the ethylene-based polymer comprises at least one product structure (A and/or B) as follows.

T-Branch Formation Through the Application of a Monomeric CTA:

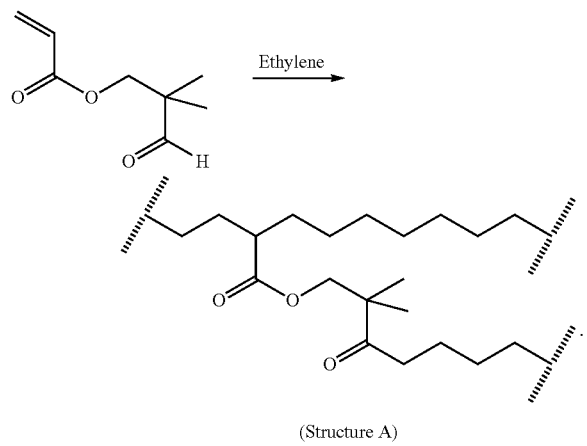

(Structure A)

H-Branch Formation Through the Application of a Polyene:

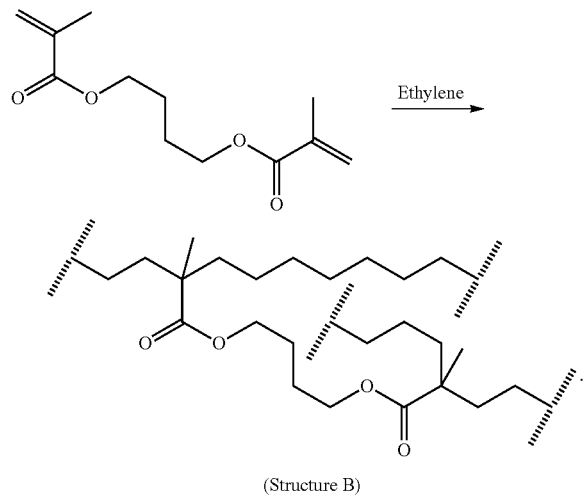

(Structure B)

In these structures, the notation "//////" represents a break at the center of a covalent carbon-carbon bond in the hydrocarbon backbone of the ethylene-based polymer molecule.

In one embodiment, the ethylene-based polymer is a modified low density polyethylene, comprising, in polymerized form, ethylene, and bonded chemical groups derived from a polyene. In a further embodiment, the modified LDPE comprises less than 2.0 wt %, further less than 1.0 wt %, of other comonomer(s), based on the weight of the modified LDPE. In one embodiment, the ethylene-based polymer comprises at least one structure C as shown below:

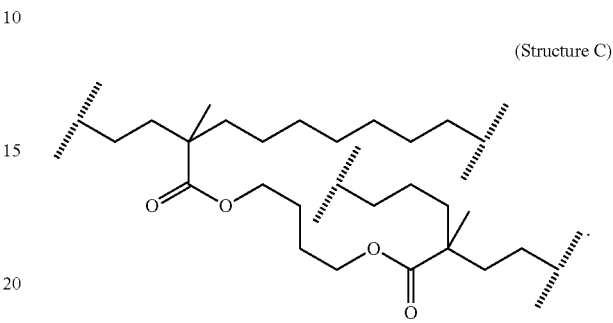

(Structure C)

In one embodiment, the ethylene-based polymer comprises, in reacted form, ≥0.1 ≥0.2, or ≥0.3, or ≥0.4 moles of "T-branches derived from the use of a mCTA" per 1000 moles of carbon atoms incorporated into the polymer, or per 500 moles of ethylene units incorporated into the polymer. In one embodiment, the ethylene-based polymer comprises, in reacted form, ≤3.0, or ≤2.0, or ≤1.5, or ≤1.2, or ≤1.0 mole of "T-branches, derived from the use of a mCTA" per 1000 moles of carbon atoms incorporated into the polymer, or per 500 moles of ethylene units incorporated into the polymer.

In one embodiment, the ethylene-based polymer comprises, in reacted form, ≥0.010, or ≥0.015, or ≥0.020, or ≥0.030, or ≥0.040, or ≥0.050 moles of "overall HI-branches," derived from the use of polyenes, per 1000 moles of carbon atoms. In one embodiment, the ethylene-based polymer comprises, in reacted form, >0.1, or >0.2, or >0.3 moles of T-branches, derived from the use of a mCTA, per 1000 moles of carbon atoms incorporated into the polymer, or per 500 moles of ethylene units incorporated into the polymer.

In one embodiment, the ethylene-based polymer has a melt index ($I_2$) from 0.7 to 20 g/10 minutes (min), or from 0.8 to 18 g/10 min, or from 0.9 to 16 g/10 min, or from 1.0 to 14.0 g/10 min, or from 1.2 to 12.0 g/10 min. In one embodiment the ethylene-based polymer has a density <0.9190 g/cc or g/cm³. In one embodiment, the ethylene-based polymer has a density ≤0.9185, or ≤0.9180, or ≤0.9175 g/cc. In one embodiment the ethylene-based polymer has a density from 0.9140 to <0.9190. In one embodiment, the ethylene-based polymer has a density from 0.9150 to <0.9190, or from 0.9150 to 0.9185, or from 0.9155 to 0.9185 g/cc.

In one embodiment, the ethylene-based polymer has a hexane extractable level that meets the following equation: hexane extractable level ≤A+B[log (I2)], where A=2.65 wt %, or 2.55 wt %, or 2.45 wt %, or 2.35 wt %, and B=0.25 wt %/[log(dg/min)]; based on total weight of the ethylene-based polymer. In one embodiment, the ethylene-based polymer has an apparent hexane extractable level of the penultimate reaction zone as defined by 0.38−(0.1488*Maximum SCB level in that reaction zone)−(0.0503*Minimum Chain segment length in that reaction-zone) that is <85% or <80% of the hexane extractable level of the polymer.

In one embodiment, the ethylene-based polymer has a G' (at G"=500 Pa, 170° C.) that meets the following: G'≥C+D [log (I2)], where C=150 Pa, or 155 Pa, or 160 Pa, and D=−60 Pa/[log(dg/min)].

The invention also provides a composition comprising an inventive ethylene-based polymer polymer as described herein. In one embodiment, the composition further comprises an ethylene/α-olefin interpolymer. In a further embodiment, the composition can have a density that ranges from 0.910 to 0.960 g/cc. In one embodiment, the composition further comprises another ethylene-based polymer that differs from the inventive ethylene-based polymer in one or more properties, for example, density, melt index (I2), Mw(conv), Mn(conv), and/or Mw(conv)/Mn(conv).

The invention also provides an article comprising at least one component formed from an inventive composition. In one embodiment, the article is a film or a coating, for example, an extrusion coating. In one embodiment, the article is a film. In another embodiment, the article is a coating. In one embodiment, the article is a coating for a cable or wire. In one embodiment, the article is a coated sheet, and in a further embodiment the sheet is selected from a metal, a paper, or another polymer substrate or combinations thereof. In a further embodiment, the coated sheet is used in a wire or cable configuration. In another embodiment, the coated sheet is used in a packaging application. In another embodiment, the coated sheet is used in a food packaging application, and further the coated sheet is used in a cook-in food packaging application. An inventive ethylene-based polymer may comprise a combination of two or more embodiments as described herein. An inventive composition or an inventive article may each comprise a combination of two or more embodiments as described herein.

For producing a highly branched ethylene-based polymer, a high pressure free-radical initiated polymerization process is typically used. Two polymerization reactor types are known. In the first type, an agitated autoclave vessel having one or more reaction zones is used. The autoclave reactor normally has several injection points for initiator and/or monomer feeds. In the second type, a jacketed tube having one or more reaction zones is used as a reactor. Suitable, but not limiting, reactor lengths may be from 100 to 3600 meters (m), or from 1000 to 2800 m. The inventive process uses a reactor configuration in which the reactor(s) is (are) only tubular reactor(s), i.e., the reactor configuration does not include any autoclave reactors. Moreover, the reactor configuration typically comprises at least four reaction zones, and these zones can be located in one tubular reactor or spread over two or more tubular reactors. Typically, each tubular reactor of this invention comprises multiple reaction zones.

Often a CTA system is used to control molecular weight. A CTA system comprises one or more CTAs. In one embodiment, one or more CTAs are added to an inventive polymerization process. CTA systems typically comprise at least one of the following groups: alkanes, aldehydes, ketones, alcohol, ether, esters, mercaptan or phosphine, or further an alkane, a ketone, an aldehyde, an alcohol or ether. Preferably, a CTA system comprises a CTA selected from saturated hydrocarbons, ketones, aldehydes, alcohols, ethers, esters, mercaptans or phosphines, further from saturated hydrocarbons, ketones, aldehydes, alcohols or ethers. Exemplary CTAs include, but are not limited to, isobutane, n-butane, methyl ethyl ketone, acetone, ethyl acetate, propionaldehyde (PA), ISOPAR™-C, -E, and -H (ExxonMobil Chemical Co.), and isopropanol; and further propionaldehyde, butane and isobutane. The CTA system preferably does not include propylene or other alkene. In one embodiment, the amount of CTA system used is from 0.01 to 10 wt %, based on the weight of the total reaction mixture.

In one embodiment the Z1/Zi ratio, wherein i≥3 and i is the last reaction zone, is less than or equal to 1.3, or less than or equal to 1.2, or less or equal than 1.1. In one embodiment the Z1/Zi ratio, wherein i≥3 and i is the last reaction zone, is greater than or equal to 0.1, or less than or equal to 0.2, or less than or equal to 0.3. In one embodiment Z1/Zi is less or equal to (0.8-0.2*log (Cs)), wherein Cs is in the range of 0.0001 and 10. In one embodiment Z1/Zi less or equal to (0.75-0.2*log (Cs)), wherein Cs is in the range of 0.0001 and 10. In one embodiment Z1/Zi less or equal to (0.7-0.2*log (Cs)), wherein Cs is in the range of 0.0001 and 10. In one embodiment the overall Cs value of the applied CTA systems is is ≤0.020 (e.g., propylene, acetone), or ≤0.010 (i.e., cyclohexane), or ≤0.008 (e.g., isobutane, ethanol), or ≤0.006 (e.g., n-butane, ethylacetate), as measured by Mortimer et al., at 130° C. and 1360 atmospheres. In one embodiment, the polymerization may take place in a tubular reactor as described in WO 2013/059469, which discloses a multi-zone reactor and alternate locations of feeding ethylene to control the ethylene to CTA system ratio and therefore polymer properties. Ethylene may be simultaneously added in multiple locations to achieve the desired ethylene to CTA system ratio. In a similar way, the location(s) for the addition of CTA system may be carefully selected to control polymer properties as described in WO 2013/078018. CTA system may be simultaneously added in multiple locations to achieve the desired CTA system to ethylene ratio.

Likewise, the addition points and the amount of the CTA system, as described in this application, may be controlled to reduce consumption, while maximizing the desired property of increased G', and desired MWD. In one embodiment, chain transfer agent is added to the first or second or first and second reaction zones. Also, the use of additional polyene (branching agent), the addition points and the amount of the polyene (branching agent) may be controlled to control gel formation, while maximizing the desired property of increased G', and desired MWD, and performance in targeted applications. In one embodiment, polyene may be simultaneously added in multiple locations to achieve the desired polyene to ethylene ratio (for example, a molar ratio). In one embodiment, the polymerization takes place in at least one tubular reactor. The addition points and amounts of ethylene, CTA system, and/or polyene may be controlled to achieve the desired ratios of CTA system to ethylene, and/or polyene to ethylene in the feeds to and/or in the reaction zones.

In one embodiment, the polymerization takes place in two reactors. In one embodiment, the polymerization takes place in one reactor with multiple or at least two reaction zones In one embodiment, the polymerization takes place in a reactor configuration comprising at least four reaction zones, reaction zone 1 and reaction zone i (i≥3) and wherein reaction zone i is downstream from reaction zone 1. In one embodiment, i is from 3-5, or from 3-4. In one embodiment, i=3. In one embodiment, the total number of reaction zones=i. In a further embodiment, i is from 3 to 20, further from 3 to 10, and further from 3 to 6. In a further embodiment, i is from 3 to 20, further from 3 to 10, and further from 3 to 6.

In one embodiment by use of a polyene in combination with a chain transfer agent, more polyene, by mass, is added to reaction zone i as compared to the amount of polyene, by mass, added to reaction zone 1. As used above, the amount of polyene is determined based on the polyene added to a reaction zone in a feed (i.e., not carry-over polyene). In one embodiment by use of a polyene in combination with a chain transfer agent, more polyene, by mass, is added to reaction zone 1 as compared to the amount of polyene, by mass, added to reaction zone i. As used above, the amount of polyene is determined based on the polyene added to a reaction zone in a feed (i.e., not carry-over polyene). In one embodiment by use of a polyene in combination with a chain transfer system, polyene is added to both reaction zone 1 and reaction zone i.

In one embodiment by use of a mCTA in combination with a chain transfer system, more mCTA, by mass, is added to reaction zone 1 as compared to the amount of mCTA, by mass, added to reaction zone i. As used above, the amount of each CTA is determined based on the CTA added to a reaction zone in a feed. In one embodiment by use of a mCTA in combination with a chain transfer system, no mCTA, by mass, is added to the last reaction zone. In one embodiment by use of a mCTA in combination with a chain transfer system, no mCTA, by mass, is added to the last two reaction zones. In one embodiment by use of a mCTA in combination with a chain transfer system, all mCTA, by mass, is added to the first two reaction zones. In one embodiment by use of a mCTA in combination with a chain transfer system, all mCTA, by mass, is added to the first reaction zone. In one embodiment by use of a mCTA in combination with a chain transfer system, all mCTA, by mass, is added to the second and third reaction zones.

In one embodiment by use of a mCTA in combination with a chain transfer system and polyene, all mCTA, by mass, is added to the first 2 reaction zones. In one embodiment by use of a mCTA in combination with a chain transfer system and polyene, all mCTA, by mass, is added to the 1st reaction zone. In one embodiment by use of a mCTA in combination with a chain transfer system and polyene, all mCTA, by mass, is added to the 2nd and 3rd reaction zones.

In one embodiment by use of a polyene in combination with a chain transfer system, polyene is added to reaction zones 1, 2, 3, and 4. In one embodiment by use of a polyene in combination with a chain transfer system, no polyene is added to reaction zone 1.

In one embodiment, prior to being fed into a reaction zone, the branching agent(s) are fed through a compression stage of a secondary compressor. In an embodiment, the branching agent(s) are fed through a compression stage of a secondary compressor, prior to being fed into each reaction zone which receives branching agent(s). In another embodiment, the branching agent(s) are fed through a compression stage directly into a reaction zone or directly into the feed for a reaction zone. In an embodiment, the concentration of polyene in the total ethylene feed to the reactor is less than 0.2 mole percent, or less than 0.1 mole percent, or less than 0.05 mole percent, or less than 0.03 mole percent based on the total moles of ethylene fed to the reactor. In an embodiment, the molar ratio of CTA versus polyene in the total ethylene feed to the reactor is $\geq 1$, or $\geq 2$, or $\geq 3$, or $\geq 4$, or $\geq 5$, or $\geq 6$.

In one embodiment, the ethylene fed to the first reaction zone is $\geq 10$ wt % of the total ethylene fed to the polymerization. In one embodiment, the ethylene fed to the first reaction zone is from 10 to 100, or from 20 to 80, or from 25 to 75, or from 30 to 70, or from 40 to 60 wt % of the total ethylene fed to the polymerization.

In one embodiment, the ethylene-based polymer comprises ethylene and one or more comonomers, and preferably one comonomer. Comonomers include α-olefins, acrylates, methacrylates and anhydrides, each typically having no more than 20 carbon atoms. The α-olefin comonomers, which have a combined monomer and CTA functionality, may have 3 to 10 carbon atoms, or 3 to 8 carbon atoms. In one embodiment, the ethylene-based polymer comprises >90 wt %, further >92 wt %, further >93 wt %, further >94 wt %, further >95 wt %, further >98 wt %, further >99 wt %, of polymerized ethylene, based on the weight of the polymer. In one embodiment the ethylene-based polymer is an ethylene homopolymer.

In one embodiment, branching agent(s) (BA(s)) are added prior to, or simultaneously with, the addition of free-radical initiator at the inlet of the reaction zone. Preferably, the BA(s) are added prior to the initiator addition, to allow for a good dispersion of the BA(s).

Free radical initiators are generally used to produce the inventive ethylene-based polymers. A free radical initiator, as used here, refers to a free radical generated by chemical and/or radiation means. Free radical initiators include organic peroxides including cyclic peroxides, diacyl peroxides, dialkyl peroxides, hydroperoxides, peroxycarbonates, peroxydicarbonates, peroxyesters, and peroxyketals. Preferred initiators are t-butyl peroxy pivalate, di-t-butyl peroxide, t-butyl peroxy acetate and t-butyl peroxy-2-hexanoate, or mixtures thereof. In one embodiment, these organic peroxide initiators are used in an amount from 0.001 to 0.2 wt %, based upon the weight of polymerizable monomers. In one embodiment, an initiator is added to at least one reaction zone, which has a half-life temperature, at one second, >255° C., preferably >260° C. In an embodiment, such initiators are used at a peak polymerization temperature from 320° C. to 350° C. In a further embodiment, the initiator comprises at least one peroxide group incorporated in a ring structure. Examples of such initiators include TRIGONOX™ 301 (3,6,9-triethyl-3,6,9-trimethyl-1,4,7-triperoxonaan) and TRIGONOX™ 311 (3,3,5,7,7-pentamethyl-1,2,4-trioxepane), both available from Akzo Nobel, and HMCH-4-AL (3,3,6,6,9,9-hexamethyl-1,2,4,5-tetroxonane) from United Initiators. See also WO 02/14379 and WO 01/68723.

In one embodiment, for the polymerization process described herein, the maximum (or peak) temperature for each reaction zone is from 150° C. to 360° C., or from 170° C. to 350° C., or from 200° C. to 340° C. In a further embodiment, the maximum temperature for each reaction zone which receives polyene (i.e., new and/or recycled polyene, not including carry-over polyene) is from 260° C. to 330° C., or from 270° C. to 320° C., or from 280° C. to 310° C.

In one embodiment, the maximum temperature (max. temp.) in the first reaction zone is greater than the max. temp. for each subsequent or consecutive reaction zone. In one embodiment, the max. temp. in the first reaction zone is $\geq 300°$ C., or $\geq 310°$ C. or $\geq 320°$ C. In one embodiment, the max. temp. in the first reaction zone is at least 10° C., or 20° C., or 30° C. greater than the max. temp. of each consecutive reaction zone. In one embodiment, the temperature of the first reaction zone is $\geq 320°$ C., or $\geq 330°$ C., or $\geq 340°$ C. In one embodiment, the temperature of the last reaction zone is $\leq 290°$ C., or $\leq 280°$ C., or $\leq 270°$ C. In one embodiment, the max. temp. difference between the first and last reaction zone $\geq 30°$ C., or $\geq 40°$ C., or $\geq 50°$ C. In one embodiment, the difference in max. temp. between any two successive reaction zones, e.g., the difference between the first and second reaction zones, or the second and third reaction zones, etc., over the length of the reaction configuration is $\geq 10°$ C., or $\geq 20°$ C., or $\geq 30°$ C. In one embodiment, the max. temp. difference between each successive reaction zone, e.g., the difference between the first and second reaction zones, and the second and third reaction zones, etc., over the length of the reaction configuration is ≥10° C., or ≥20° C., or ≥30° C. In one embodiment, the ratio of the max. temp. of the first reaction zone (e.g., 320° C.) to the last, or $n^{th}$, reaction zone (e.g., 290° C.) is at least 1.1, or at least 1.2, or at least 1.3. In one embodiment, the max. temp. of the last reaction zone is less than the max. temp. of each prior reaction zone.

In one embodiment, the polymerization pressure as measured at the first inlet of the reactor is from 1000 bar to 3600 bar, or from 1200 bar to 3500 bar, or from 1500 to 3400 bar, or from 2000 to 3200 bar. In one embodiment, the polyene is subject to an "oxygen removal step" prior to being fed to a reaction zone. In one embodiment, the polyene is stored in a feed vessel, and wherein the feed vessel has a "head-space gas" comprising less than 5.0 volume percent oxygen.

An inventive process may comprise a combination of ≥2 embodiments as described herein.

An inventive composition may comprise one or more additives. Additives include, but are not limited to, stabilizers (e.g., antioxidants), plasticizers, antistatic agents, pigments, dyes, nucleating agents, fillers, slip agents, fire retardants, processing aids, smoke inhibitors, viscosity control agents and anti-blocking agents. The polymer composition may, for example, comprise less than 10% of the combined weight of one or more additives, based on the weight of the inventive polymer. An inventive composition may further comprise at least one other polymer, in addition to an inventive ethylene-based polymer. Suitable polymers for blending with the inventive polymers include natural and synthetic polymers.

Definitions

Unless stated to the contrary, implicit from the context, or customary in the art, all parts and percents are based on weight, and all test methods are current as of the filing date of this application. The term "composition," as used herein, includes a mixture of materials, which comprise the composition, as well as reaction products and decomposition products formed from the materials of the composition. The terms "blend" or "polymer blend," as used, refers to a mixture of two or more polymers. A blend may or may not be miscible (not phase separated at molecular level). A blend may or may not be phase separated. The terms "comprising," "including," "having," and their derivatives, do not exclude the presence of any additional component, step or procedure, whether or not the same is specifically recited. The term, "consisting essentially of" excludes from the scope of any succeeding recitation, any other component, step, or procedure, except those that are not essential to operability. The term "consisting of" excludes any component, step, or procedure not specifically recited.

The term "polymer" refers to a compound prepared by polymerizing monomers, whether of the same or a different type. The generic term polymer thus embraces the term homopolymer, and the term "interpolymer" as defined below. Trace amounts of impurities may be incorporated into and/or within the polymer. The term "interpolymer" refers to polymers prepared by the polymerization of at least two different types of monomers. The generic term interpolymer includes copolymers (which refers to polymers prepared from two different monomers), and polymers prepared from more than two different types of monomers.

The term "ethylene-based polymer" refers to a polymer that comprises a majority amount of polymerized ethylene, based on the weight of the polymer, and, optionally, at least one comonomer. The term "ethylene-based interpolymer" refers to an interpolymer that comprises a majority amount of polymerized ethylene, based on the weight of the interpolymer, and at least one comonomer. The term "ethylene-based copolymer" refers to a copolymer that comprises a majority amount of polymerized ethylene, based on the weight of the copolymer, and a comonomer as the only monomer types.

The term "polyene," as used herein, refers to a poly-unsaturated compound having ≥2 carbon-carbon double bonds. The term "monomeric CTA (mCTA)," as used herein, refers to a poly-functional compound having one or more carbon-carbon double bonds and having one or more functional groups with elevated chain transfer activity (Cs value measured by Mortimer at 130° C. and 1360 atmospheres) ≥0.10.

The terms "rheology modifier" or "rheology modifying agent," as used herein, refer to the polyenes and/or mCTAs, as described herein, which are able to change the rheology of the polymer, for example, increase G' and melt strength, when incorporated into the polymer. The terms "branching agent", abbreviated as "BA", as used herein, refers to components able to form H- or T-branches in polymer, by which rheology of the polymer is modified, for example, increase of G'. Typical branching agents include symmetrical polyenes, asymmetrical polyenes and mCTAs.

The term "alkyl," as used herein, refers to a saturated linear, cyclic, or branched hydrocarbon group. Nonlimiting examples of suitable alkyl groups include, for example, methyl, ethyl, n-propyl, i-propyl, n-butyl, t-butyl, i-butyl (or 2-methylpropyl), etc. In one embodiment, the alkyls have 1 to 20 carbon atoms.

The term "high pressure polymerization process," as used herein, refers to a free radical polymerization process carried out at an elevated pressure of at least 1000 bar (100 MPa).

The terms "feed" or "feed stream," as used herein, refer to make-up and/or recycled component(s) added to a reaction zone at an inlet. A feed may consist of branching agent(s) or ethylene, comprise branching agent(s) or ethylene, or comprise branching agent(s) and ethylene. The terms "side stream" or "side feed stream," as used herein, refer to the ethylene-rich feed stream to sequential reaction zones.

The term "make-up," when used herein in reference to a component (i.e., "make-up ethylene," "make-up CTA," "make-up mCTA," etc.), refers to the feed stream of the reactant needed to compensate for the converted and/or lost component in the high polymerization process.

The term "reaction zone," as used herein, refers to a reactor zone where the polymerization reaction is initiated or reinitiated by the addition of free radicals and/or components which dissociate into and/or generate free radicals. Typically, the reaction medium is heated and/or cooled by a heat transfer medium flowing through the jacket around the reactor. A reaction zone may also start with the addition of ethylene and/or free radicals or components which dissociate into and/or generate free radicals.

The term "first reaction zone," as used herein, refers to the first reactor zone where the polymerization is initiated by the addition of radicals or components which dissociate into and/or generate radicals. The first reaction zone ends at the point where there is a new feed of make-up and/or recycled ethylene, radicals, and/or components which dissociate into and/or generate radicals. The terms "subsequent reaction zone," or "sequential reaction zone," as used herein, refer to a reactor zone which receives ethylene and polymer from a previous reactor zone, and where radicals or components which dissociate into and/or generate radicals are added at the inlet of the subsequent (or sequential) reactor zone. The subsequent (or sequential) reaction zone ends at the point where there is a make-up and/or recycled ethylene, radicals, and/or components which dissociate into and/or generate, radicals; however, the last reaction zone ends at the position of a pressure control device of the reactor system.

The terms "chain transfer constant" and "chain transfer coefficient (Cs value)" as used herein, refer to the ratio between the "rate of chain transfer" to the "rate of ethylene propagation." See Mortimer references provided in Experimental section. The terms "chain transfer activity" refers to the sum of molar concentration of each applied CTA component multiplied with its chain transfer constant (Cs). The chain transfer constant (Cs) is the ratio of reaction rates Ks/Kp, at a reference pressure (1360 atmospheres or 137.8 MPa) and a reference temperature (30° C.).

The term "reactor configuration (or reactor system)," as used herein, refers to the components (devices) used to polymerize and isolate a polymer. Such components/devices include, but are not limited to, one or more reactors, a secondary compressor, a primary compressor, and a booster compressor.

The booster compressor (Booster) is a device that compresses the following: a) the low pressure recycle coming from the LPS (Low Pressure Separator), and b) optionally, the recycled compressor packing leaks, each to the pressure level required at the inlet side of the primary compressor. A Booster can consist of single or multiple compressor frames, and can be potentially combined with primary compressor frame(s). The primary compressor (Primary) is a device that compresses the following: a) the incoming ethylene, and/or b) the low pressure recycle coming from the Booster, and/or c) the recycled compressor packing leaks, each to the pressure level required to feed the inlet side of the hyper compressor. The primary can consist of single or multiple compressor frames, and can be potentially combined with Booster compressor frame(s). Hyper compressor (Hyper), or secondary compressor, is a device that compresses the following: a) the ethylene coming from the HPR (High Pressure Recycle), and/or b) the Primary, each to a pressure level required to feed the reactor at its inlet pressure set point. The Hyper comprises a plunger reciprocating compressor, and can consist of single or multiple compressor frame(s). For these devices, each compression can be combined with intermediate cooling.

Test Methods

Density—

Samples for density measurement are prepared according to ASTM D 1928. Samples are pressed at 190° C. and 30,000 psi (206.84 MPa) for three minutes (min), and then at (21° C.) and 207 MPa for one min. Measurements made within one hour of sample pressing using ASTM D792, Method B.

Melt index, or I2 or MI, is measured in accordance by ASTM D 1238, Condition 190° C./2.16 kg, and is reported in grams eluted per 10 minutes (g/10 min).

Standard Method for Hexane Extractables—

Polymer pellets (from the polymerization pelletization, without further modification; approx. 2.2 grams per press) are pressed in a Carver Press at a thickness of 3.0-4.0 mils. The pellets are pressed at 190° C. for 3 min at 40,000 lbr. Non-residue gloves (PIP*CleanTeam* CottonLisle Inspection Gloves, Part Number: 97-501) are worn to prevent contamination of the films with residual oils from the hands of the operator. Films are cut into "1-inch by 1-inch" squares, and weighed (2.5±0.05 g). The films are extracted for two hours, in a hexane vessel, containing about 1000 ml of hexane, at 49.5±0.5° C., in a heated water bath. The hexane used is an isomeric "hexanes" mixture (for example, Hexanes (Optima), Fisher Chemical, high purity mobile phase for HPLC and/or extraction solvent for GC applications). After two hours, the films are removed, rinsed in clean hexane, and dried in a vacuum oven (80±5° C.) at full vacuum (ISOTEMP Vacuum Oven, Model 281A, at approximately 30 inches Hg) for two hours. The films are then place in desiccators, and allowed to cool to room temperature for a minimum of one hour. The films are then reweighed, and the amount of mass loss due to the extraction is calculated. This method is based on 21 CRF 177.1520 (d)(3)(ii) FDA protocol, except hexanes instead of n-hexane is used.

Rheological G'—

The sample used in the G' measurement is prepared from a compression molding plaque. A piece of aluminum foil is placed on a back plate, and a template or mold is placed on top of the back plate. Approximately 12 grams of resin is placed in the mold, and a second piece of aluminum foil is placed over the resin and mold. A second back plate is then placed on top of the aluminum foil. The total ensemble is put into a compression molding press run at the following conditions: 3 min at 150° C. and 10 bar, followed by 1 min at 150° C. and 150 bar, followed by a "1.5 min" quench cooling to room temperature at 150 bar. A 25 mm disk is stamped out of the compression-molded plaque. The thickness of the disk is approximately 2.0 mm. The rheology measurement to determine G' is done in a nitrogen environment at 170° C. and a strain of 10%. The stamped-out disk is placed between the two "25 mm" parallel plates located in an ARES-1 (Rheometrics SC) rheometer oven, which is preheated for at least 30 minutes at 170° C., and the gap of the "25 mm" parallel plates is slowly reduced to 1.65 mm. The sample is then allowed to remain for exactly 5 minutes at these conditions. The oven is then opened, the excess sample is carefully trimmed around the edge of the plates, and the oven is closed. The storage modulus (G') and loss modulus (G") of the sample are measured via a small amplitude, oscillatory shear according to a decreasing frequency sweep form 100 to 0.1 rad/s (when able to obtain a G" value lower than 500 Pa at 0.1 rad/s), or from 100 to 0.01 rad/s. For each frequency sweep, 1-points (logarithmically spaced) per frequency decade are used.

The data are plotted (G' (Y-axis) versus G" (X-axis)) on a log-log scale. The Y-axis scale covers the range from 10 to 1000 Pa, while the X-axis scale covers the range from 100 to 1000 Pa. Orchestrator software is used to select the data in the region where G" is between 200 and 800 Pa (or using at least 4 data points). The data are fit to a log polynomial model using the fit equation Y=C1+C2 ln(x). Using the Orchestrator software, G' at G" equal to 500 Pa is determined by interpolation. G' at G"=500 Pa is reported.

EXPERIMENTAL

Calculations for Z1, Z2 and Zi:

The "reactor zone molar concentration of a CTA j in a reactor zone i ([CTA]ji)" is defined as the "total molar amount of that CIA injected to reactor zones 1 to i" divided by the "total molar amount of ethylene injected to reactor zones 1 to I," as shown in Equation (Eqn) A:

$$[CTA]_{j_i} = \frac{\sum_{k=1}^{i} n_{CTA,j_k}}{\sum_{k=1}^{i} n_{eth_k}}.$$ (Eqn A)

In Eqn A, j≥1, $n_{CTA,j}$, is the "amount of moles of the jth CTA injected to the ith reactor zone," and $n_{eth}$, is the "amount of moles of ethylene injected to the ith reactor zone." The "transfer activity of a CTA (system) in a reactor zone i" is defined as the "sum of the reactor zone molar concentration of each CTA in the reactor zone" multiplied with its chain transfer activity constant (Cs). The chain transfer activity constant (Cs) the ratio of reaction rates Ks/Kp, at a reference pressure (1360 atm, 137.8 MPa) and a reference temperature (130° C.). This relationship is shown below in Eqn. B, where $n_{comp}i$ is the total number of CTAs in reactor zone i.

$$Z_i = \sum_{j=1}^{n_{comp}} [CTA]_{j_i} \cdot C_{s,j}.$$ (Eqn. B)

Thus, the ratio Z1/Zi is shown in Eqn C, $$\frac{Z_1}{Z_i} = \frac{\sum_{j=1}^{n_{comp}} [CTA]_{j_1} \cdot C_{s,j}}{\sum_{j=1}^{n_{comp}} [CTA]_{j_i} \cdot C_{s,j}}.$$ (Eqn. C)

The chain transfer constant (Cs) values for some chain transfer agents are shown below in Table 1.

TABLE 1

| | Cs (130° C., 1360 atm) | (0.8– 0.2 * log(Cs)) | (0.75– 0.2 * log(Cs)) |
|---|---|---|---|
| Methanol | 0.0021 | 1.34 | 1.29 |
| Propane | 0.00302 | 1.30 | 1.25 |
| Ethylacetate | 0.0045 | 1.27 | 1.22 |
| n-butane | 0.005 | 1.26 | 1.21 |
| Isobutane | 0.0072 | 1.23 | 1.18 |
| Ethanol | 0.0075 | 1.22 | 1.17 |
| Cyclohexane | 0.0095 | 1.20 | 1.15 |
| Propylene | 0.0122 | 1.18 | 1.13 |
| Isopropanol | 0.0144 | 1.17 | 1.12 |
| Acetone | 0.0168 | 1.15 | 1.10 |
| Butene-1 | 0.047 | 1.07 | 1.02 |
| MEK | 0.06 | 1.04 | 0.99 |
| PA | 0.33 | 0.90 | 0.85 |
| n-butanethiol | 5.8 | 0.65 | 0.60 |

In Table 1, the Cs-Values as Measured by Mortimer at 130° C. and 1360 atm in References 2, 3 and 4 and calculated boundary values for Z1/Zi ratio. The Cs value is for a CTA system containing only the noted CTA. Ref. No. 2. G. Mortimer; Journal of Polymer Science: Part A-1; Chain transfer in ethylene polymerization; vol 4, p 881-900 (1966). Ref. No. 3. G. Mortimer; Journal of Polymer Science: Part A-1; Chain transfer in ethylene polymerization. Part IV. Additional study at 1360 atm and 130° C.; vol 8, p1513-1523 (1970). Ref. No. 4. G. Mortimer; Journal of Polymer Science: Part A-1; Chain transfer in ethylene polymerization. Part VII. Very reactive and depleteable transfer agents; vol 10, p163-168 (1972). See also P. Ehrlich, G. A. Mortimer, Fundamentals of the free radical polymerization of ethylene, Adv. Polymer Sci., Vol 7, 386-448 (1970); G. Mortimer, Journal of Polymer Science: Part A-1, Chain transfer in ethylene polymerization. Part V. The effect of temperature; vol 8, p1535-1542 (1970); G. Mortimer, Journal of Polymer Science: Part A-1, *Chain transfer in ethylene polymerization* Part V. The effect of pressure, vol 8, p1543-1548 (1970).

When only one CTA is used in the total reactor system, Eqns. B and C simplify to Eqns. D and E, respectively. $Z_i = [CTA]_i \cdot C_s$ (Eqn. D), $$\frac{Z_1}{Z_i} = \frac{[CTA]_1 \cdot C_s}{[CTA]_i \cdot C_s} = \frac{[CTA]_1}{[CTA]_i}.$$ (Eqn. E)

For a multiple CTA-system an averaged Cs-value can be calculated with the following equation:

$$Cs(\text{averaged}) = \sum_{1}^{n} \frac{[CTA]_- * Cs_-}{\sum_{1}^{n}([CTA]_- * Cs_-)} * Cs_n.$$ (Eqn. F)

Example Calculation:

Propylene concentration=3400 mol-ppm; Cs-value of propylene=0.0122; PA conc.=1650 mol-ppm; Cs-value of PA=0.33; Cs(averaged)=[(3400 mol-ppm*0.0122*0.0122)+(1650 mol-ppm*0.33*0.33)]/(3400 mol-ppm*0.0122+1650 mol-ppm*0.33)=0.31.

Polymerization Simulations

A polymerization simulation model with applied reaction scheme and kinetics is described by Goto et al., see references below. Other reactor and product modeling frameworks are available through Aspen Plus of Aspen Technology, Inc., Burlington, Mass., USA; and PREDICI of Dr. Wulkow Computing in Technology GmbH (CiT), Rastede, Germany. Process and product responses predicted by these model frameworks are determined by the reactor parameters and the applied reaction scheme and kinetic parameters. The applied reaction scheme and kinetic parameters are described below. For each well-stirred autoclave reaction zone one calculation cell can be used. For each tubular reaction zone enough calculation cells are used to accurately represent the pressure, temperature and concentration profiles along the tubular reaction zone, such that the simulated product and process results, as reported in Tables 6-9, do not change with the addition of more cells. The polymerization simulations are achieved with Goto LDPE simulation model as described in the following: S. Goto et al; *Journal of Applied Polymer Science: Applied Polymer Symposium,* 36, 21-40, 1981 (Title: *Computer model for commercial high pressure polyethylene reactor based on elementary reaction rates obtained experimentally*).

The kinetic data used by Goto et al. is derived from high pressure free radical polyethylene polymerization experiments performed at varying temperature, pressure and polymer concentrations as described in the following: K. Yamamoto, M. Sugimoto: *Rate constant for long chain-chain branch formation in free-radical polymerization of ethylene: J. Macromol. Science-Chem.*, A13 (8), pp. 1067-1080 (1979). The following elementary reaction steps are described by Goto et al.: i) propagation of ethylene, ii) termination of radicals, iii) backbiting or short chain branching (SCB) formation, iv) transfer to polymer or long chain branching (LCB) formation, v) beta elimination of secondary radicals leading to vinyl formation, and vi) beta elimination of tertiary radicals leading to vinylidene formation. See Table 2 for kinetic data for main reactions, where ko is the pre-exponential or frequency factor; Ea is the activation energy, reflecting the temperature dependence; and ΔV is the activation volume, reflecting the pressure dependence. All kinetic constants are from Goto et al., except the ko, Ea and ΔV values for backbiting, which have been optimized to better reflect the level of methyl branches (as may be analyzed by C13 NMR technique) in high pressure polyethylene, as a function of pressure and temperature conditions.

TABLE 2

Kinetic Constants for Main Reactions

| Reaction | ko (m3/hr/kmol) | Ea (cal/mol) | ΔV (cc/mol) |
|---|---|---|---|
| Propagation | 5.63E+11 | 10520 | −19.7 |
| Termination | 3E+11 | 3000 | 13 |
| Backbiting | 2.6E+12 | 12130 | −14 |
| Transfer to Polymer | 1.75E+12 | 14080 | 4.4 |
| Beta Elimination of sec rad | 5.82E+11 | 15760 | −22.6 |
| Beta Elimination of tert rad | 8.51E+10 | 14530 | −19.7 |

The kinetic data for selected CTAs are given in Table 3. The kinetic constants are calculated with the help of the kinetic constants on the Cs-value (ks/kp), as determined by Mortimer (see reference above), and the ethylene propagation kinetics as given by Goto et al. (see Table 1). The kinetic data for the selected mCTA is given in Table 3. The kinetics on "Chain transfer to Modifier" describes the CTA functionality, while the monomeric functionality is described by the "Reactivity Ratios". The polyenes are described, and modeled, through assigning kinetic $r_1$ and $r_2$ reactivity ratios (see Tables 2 and 3). The kinetic $r_1$ and $r_2$ reactivity ratios are, by definition, linked to the ethylene propagation kinetics for their temperature (Ea) and pressure (ΔV) dependencies. In the simulations, it is assumed that the polyenes do not exhibit additional chain transfer activity. Furthermore, for the total consumption, incorporation and T- and/or H-branch (inter- and intra-molecular) formation, it is assumed that, after incorporation of one functional group, the reactivity of the other functional group is not affected. In reality, the reactivity of the second functional group will be decreased after incorporation of the branching agent through its primary functional group in a polymer molecule. However, this assumption will not affect the second part of the study in Tables 6 and 7 (see IE1 to IE10). The first part of the study (CE12 to CE16), comprising actual polymerization results and simulations of these, focuses on the incorporation of the rheology modifier in the polymer, and the conversion to H-branches, to increase melt strength and G' values of the formed polymer. Other polyenes, able to form H-branches, can show a similar impact on G'; however the type and the activity of the functional groups can show secondary effects on process stability, fouling and gel formation, consumption level of polyene and gel level in polymer. mCTAs, able forming T-branches which are equivalent to long chain branches (LCB), are also able to increase G'. However a T-branch is less effective to increase G' than a H-branch, by which a higher conc. of mCTAs is needed vs. using a polyene.

TABLE 3

Kinetic Constants for Selected CTA's and mCTA (Bifunctional Component)

| | Chain Transfer to Modifier | | | Reactivity Ratios | |
|---|---|---|---|---|---|
| Component | kao (m3/hr/kgmol) | Ea (cal/mol) | ΔV (cc/mol) | $r_1$ ($k_{11}/k_{12}$) | $r_2$ ($k_{22}/k_{21}$) |
| Propylene (CTA) | 2.20E+11 | 13220 | −16.7 | 3.10 | 0.77 |
| Propionaldehyde (CTA) | 1.07E+11 | 9720 | −8.4 | 0.00 | 0.56 |
| Acetone | 3.25E+11 | 13320 | −18.6 | 0.00 | 6.00 |
| Isobutane (CTA) | 3.51E+11 | 14020 | −16.7 | 0.00 | 0.00 |
| Monomeric CTA | 1.88E+11* | 10520* | −19.7* | 0.08** | 12.5** |

Note:
*Kinetic parameters to describe reactivity of the CTA group of the mCTA.
Note:
**Kinetic parameters to describe the reactivity of the monomeric group of the mCTA.

TABLE 4

Reactivity Ratios for Polyenes (Bifunctional Model Components)

| | | Reactivity Ratios | | |
|---|---|---|---|---|
| | | $r_{1B}/r_{1A}$ | $r_1$ ($k_{11}/k_{12}$) | $r_2$ ($k_{22}/k_{21}$) |
| BDMA | Bond A | 1 | 0.08 | 12.50 |
| | Bond B | | 0.08 | 12.50 |
| PPG-AEMA | Bond A | 1 | 0.08 | 12.5 |
| | Bond B | | 0.4 | 2.5 |

BDMA is 1,4-butanediol dimethacrylate, structure i.
PPG-AEMA is poly(propylene glycol) allyl ether methacrylate, structure h.

Short Chain Branching Prediction—

Regarding SCBs, the backbiting mechanism generates mostly ethyl and butyl branches, while methyl branches are formed through copolymerization when propylene is used as a CTA to lower product density. A methyl branch has less impact on product density and extractability than an ethyl/butyl branch and, for calculation purposes, it has been assumed that the impact of a methyl branch is 75% of the impact of an ethyl/butyl branch on product density, leading to: $SCB_{frequency} = SCB_{by\ backbiting} + 0.75 * SCB_{by\ propylene}$
Parameter for modeling of hexane extractable level: The extractability of polymer molecules in non-polar solvents is influenced by polymer density (or in other words, by polymer melting point or SCB frequency), and molecular weight. A higher SCB level and lower molecular weight will promote extraction. In a tubular reactor, the polymer formed in the last reaction zone, at peak temp., will greatly contribute to and determine the final extractable level, since it typically has the highest level of SCB combined with a low chain length, due to lower degree of polymerization (DP, the propagation rate divided by the sum of all chain termination steps excluding LCB) and the higher degree of LCB. The probability of further growth of formed small molecules by the LCB mechanism is minimal by size of the molecules and low amount of remaining polymerization.

The chain segment length is calculated with the help of the following formula: Chain segment length (number of carbons) = $(1000 - 3 * SCB_{freq})/(1000/DP + LCB_{freq})$ and reflects the average chain segment lengths of the polymer formed at the conditions leading to the SCB frequency, DP and LCB frequency values. Using the maximum SCB frequency and maximum LCB frequency in the last reaction zone, an average value for the minimum polymer chain segment length can be calculated. The minimum chain segment length listed in Table 9 shows the number of carbon atoms of the linear backbone. The length of an average SCB was assumed to be 3 carbon atoms, being the average of an ethyl and butyl branch. Methyl branches deriving from propylene as CTA were treated after application of the 0.75 correction factor in a similar manner. The following is a representative calculation for the minimum chain segment length based on the values from Inventive Example 2: Minimum DP=440 ethylene units or 880 Carbon atoms; Maximum SCB frequency=40.64 per 1000 Carbon atoms (1000 C); maximum LCB frequency=10.01 per 1000 C; minimum Chain segment length=(1000−3*40.64)/(1000/880+10.01)=78.8 Carbon atoms.

Study 1—Comparative and Inventive Actual Polymerization Examples

In each flow scheme, FIGS. 1-9, in the Reactor, the polymerization is initiated with the help of free radical initiation systems, injected and/or activated at the inlet of each reaction zone. The maximum temperature in each reaction zone is controlled at a set point by regulating the concentration and/or feed amount of initiation system at the start of each reaction zone. After finishing the reaction, and having applied multiple cooling steps, the reaction mixture is depressurized and/or cooled in (10), and separated in the high pressure separator (HPS). The HPS separates the reaction mixture into an ethylene rich stream (15), containing minor amounts of waxes and/or entrained polymer, and a polymer rich stream (11) which is sent for further separation to the low pressure separator (LPS). Ethylene stream (15) is cooled and liquids and/or solids are removed in stream (17). Stream (16) is a purge stream to remove impurities and/or inerts. The polymer separated in the LPS is further processed in (12). The ethylene removed (13) in the LPS is fed to the Booster, where, during the compression, condensables such as solvent, lubrication oil and others are collected and removed through stream (14). The outlet of the Booster is combined with make-up ethylene stream (1), and further compressed by the Primary compressors. In each reaction zone, pressurized water was used for cooling and/or heating the reaction medium, by circulating this water through the jacket of the reactor. The non-converted ethylene, and other gaseous components in the reactor outlet, were recycled through the high pressure recycle and low pressure recycle, and were compressed and distributed through the booster, primary and hyper (secondary) compressor systems.

Description of Flow Diagram Used for Comparative 3, 4, 5, 8 and 9

Figure 9:
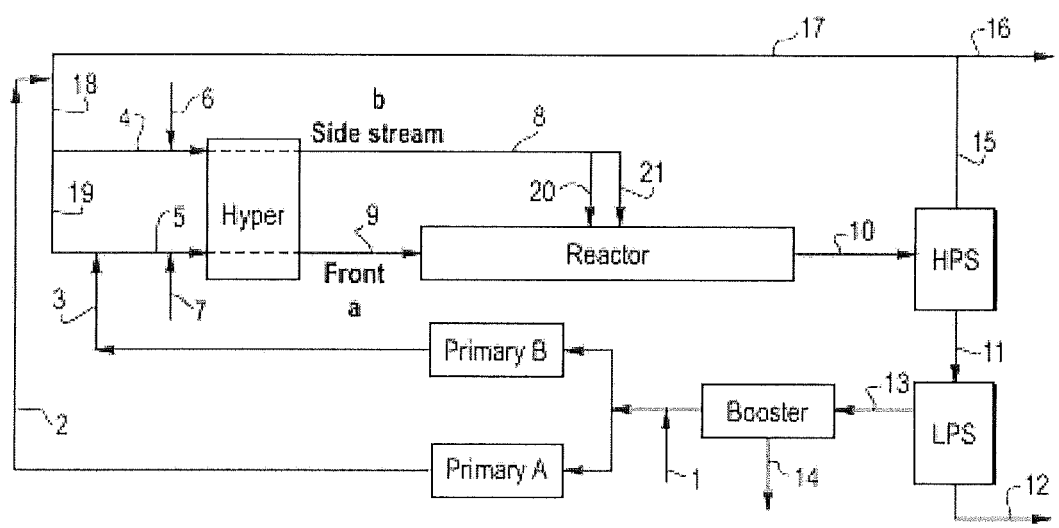
FIG. 9 is a flow diagram for Comp. Exs. 3 to 5, 8 and 9.

FIG. 9 shows the flow scheme of the high pressure polymerization process with a tubular reactor, used to produce Comparative Example 3, 4, 5, 8 and 9. Stream (1), ethylene make-up, is compressed together with the outlet of the Booster by Primary compressor B and A resulting in stream (3) and (2). Stream (3) is fed together with additional ethylene from the high pressure recycle stream (19) through line (5) to the Hyper compressor part feeding the front (9) of the Reactor. Stream (2) is combined with the high pressure recycle stream (17) resulting in stream (18). The Hyper compressor part feeding the side stream (8) receives ethylene feed through line (18) and (4). The ethylene supplied by line (8) is distributed through line (20) and (21) to the side of the reactor. CTA is fed through Line (6) and Line (7).

Figure 7:
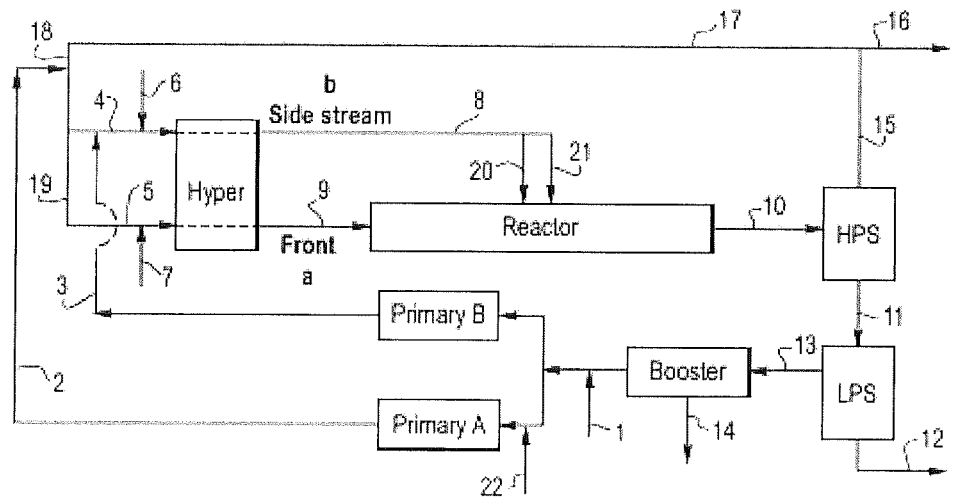
FIG. 7 is a flow diagram for Comp. Exs. 6, 10 to 13 and 16.

Description of Flow Diagram used for Comparative 6, 10 to 13 and 16 FIG. 7 shows the flow scheme of the high pressure polymerization process with a tubular reactor used to produce Comparative examples 6, 10 to 13 and 16. Stream (1), ethylene make-up, is compressed together with the outlet of the Booster by two parallel Primary compressors A+B, both have similar capacity, resulting in flow (2) and flow (3). CTA is added through (22) to the feed of Primary compressor A. Stream (2) is combined with high pressure recycle stream (18), and distributed over flow (4) and flow (19). The Hyper compressor part feeding the front (9) of the reactor, receives from line (18) ethylene feed through line (19) and line (5). The Hyper compressor part feeding the side stream (8) receives ethylene feed through line (4). The ethylene supplied by line (8) is distributed through line (20) and (21) to the side of the reactor. Line (4) receives ethylene feed from line (3) and additional ethylene from line (18). The Hyper pressurizes the ethylene feed streams to a level sufficient to feed the high pressure tubular reactor (Reactor). Stream (6) and/or stream (7) depict the polyene feed.

Description of Flow Diagram Used for Comp. Example 7, 14 and Inventive Example 10

Figure 8:
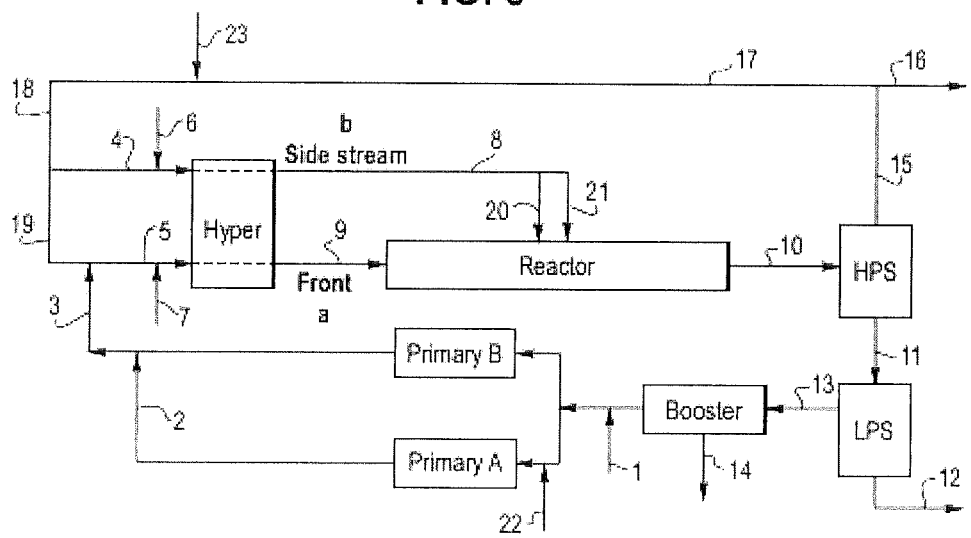
FIG. 8 is a flow diagram for Comp. Exs. 7, 14 and 17.

FIG. 8 shows the flow scheme of the high pressure polymerization process with a tubular reactor, used to produce Comparative Example 7, 14 and Inventive Example 10. Stream (1), ethylene make-up, is compressed together with the outlet of the Booster by Primary compressor system resulting in flow (3). Stream (3) is combined with high pressure recycle stream (19) and fed through line 5 to the Hyper compressor part feeding the front (9) of the Reactor. The Hyper compressor part feeding the side stream (8) receives ethylene feed through line (4). The ethylene supplied by line (8) is distributed through line (20) and (21) to the side of the reactor. Line (4) receives ethylene feed from line (18). The CTA is fed through line (22). The Hyper pressurizes the ethylene feed streams to a level sufficient to feed the high pressure tubular reactor (Reactor). Stream (6) and/or stream (7) depict the polyene feed.

Description of Flow Diagram Used for Comparative Example 15

Figure 6:
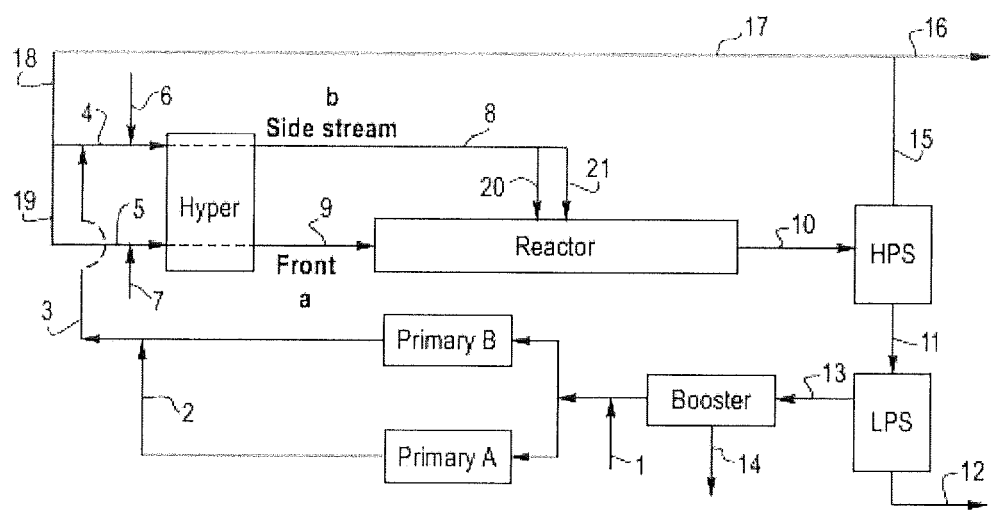
FIG. 6 is a flow diagram for Comp. Ex. 15.

FIG. 6 shows the flow scheme of the high pressure polymerization process (tubular reactor) used to produce Comp. Ex. 15. Stream (1), ethylene make-up, is compressed, together with the outlet of the Booster by Primary compressor system, resulting in flow (3) and (2). Stream (3) is fed together with additional ethylene from the high pressure recycle stream (18) through line (4) to the Hyper compressor part feeding the side (8) of the Reactor. The ethylene supplied by line (8) is distributed through line (20) and (21) to the side of the reactor. The Hyper compressor part feeding the front stream (9) receives ethylene feed through line (19) and (5) from the high pressure recycle stream (18). Line (6) and Line (7) depict lines for feeding separately CTA and branching agent to respectively line (4) and line (5).

Comparative Polymerizations 3-16 and Inventive Example 10

The reaction zones in all comparative polymerizations and one inventive polymerization were initiated with peroxide systems described in Table 5, if not mentioned differently. The amount of peroxide system to each reaction zone was adjusted to reach peak control temperatures.

TABLE 5

| | Initiators | |
|---|---|---|
| Initiator | Abbreviation | Used in Rx-zone 1/2/3 |
| tert-Butyl peroxy-2-ethyl hexanoate | TBPO | yes/yes/no |
| Di-tert-butyl peroxide | DTBP | yes/yes/yes |

Description and Synthesis of Asymmetrical Diene Poly (Propylene Glycol) Allyl Ether Methacrylate (PPG-AEMA) Used as Branching Agent in the Actual Polymerizations All methacrylate monomers in this application were prepared in accordance with the method of Example 1 in U.S. Pat. No. 4,916,255. In this case, XUS-13402.00, a polyglycol, commercially available from The Dow Chemical Company, was used to make the poly(propylene glycol) allyl ether methacrylate. The kinetics of PPG-AEMA is given in Table 4. Simulation results on this polyene can be found in Table 6 to 9. The structure and additional properties for PPG-AEMA can be found below:

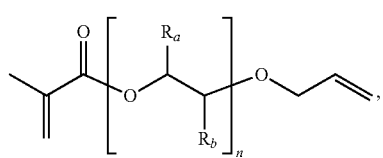

Mn of about 280 g/mole; n from about 1 to about 10; isomeric oligomeric mixture, for each n, Ra=H and Rb=CH3, and Ra=CH3 and Rb=H).

Comparative Examples 3-5, 8, 9

The polymerization was carried out in tubular reactor with three reaction zones. Organic peroxides (Table 5) and were fed into each reaction zone. TRIGONOX™ 301 was added in reaction zone 1 and 2. Acetone was used as a chain transfer agent (CTA), and it was present in each reaction zone inlet, originating from the low pressure and high pressure recycle flows (#13 and #15), as well as from injected CTA make-up stream #6 and #7. The make-up ethylene is fed through stream #1. After reaching the first peak temperature (maximum temperature) in reaction zone 1, the reaction medium was cooled with the aid of the pressurized water. At the outlet of reaction zone 1, the reaction medium was further cooled by injecting a cold, ethylene-rich feed stream (#20), and the reaction was re-initiated by feeding an organic peroxide system. This process was repeated at the end of the second reaction zone, to enable further polymerization in the third reaction zone. The polymer was extruded and pelletized (about 30 pellets per gram), using a single screw extruder system, at a melt temperature around 230-250° C. The weight ratio of the ethylene-rich feed streams to the three reaction zones was 1.00:0.76:0.24. The internal process velocity was approximately 12.5, 9 and 11 m/sec for respectively the $1^{st}$, $2^{nd}$ and $3^{rd}$ reaction zones.

Comp. Ex. 5

Propylene was used as the CTA. The propylene was added to the suction of Primary A and not via stream 6 and 7. The polymerization for Comp. Ex. 9 was carried out similar to Comp. Exs. 3, 4 and 8, but no TRIGONOX™ 301 was used, and instead of acetone, propionaldehyde was used as CTA. The main differences are MI, peak temps and ethylene distribution. See also Tables 6 and 7.

Comparative Examples 6, 10-13 and 16

The polymerization was carried out in tubular reactor with three reaction zones as discussed for Comp. Ex. 3. See FIG. 7. Organic peroxides (see Table 5) were fed into each reaction zone. Propylene was used as a chain transfer agent (CTA), and it was present in each reaction zone inlet, originating from the low pressure and high pressure recycle flows (#13 and #15), as well as from injected CTA make-up stream #22. The make-up ethylene is fed through stream #1. After reaching the first peak temperature (maximum temperature) in reaction zone 1, the reaction medium was cooled with the aid of the pressurized water. At the outlet of reaction zone 1, the reaction medium was further cooled by injecting a cold, ethylene-rich feed stream (#20), and the reaction was re-initiated by feeding an organic peroxide system. This process was repeated at the end of the second reaction zone, to enable further polymerization in the third reaction zone. The polymer was extruded and pelletized (about 30 pellets per gram), using a single screw extruder, at a melt temperature around 230-250° C. The weight ratio of the ethylene-rich feed streams to the three reaction zones was 1.00:0.80:0.20. The internal process velocity was approximately 12.5, 9 and 11 m/sec for respectively the $1^{st}$, $2^{nd}$ and $3^{rd}$ reaction zones. Comp. Example 10—propionaldehyde was used as CTA, and added via stream #7. Comp. Example 11—isobutane was used as the CTA. Comp. Example 12—the rheology modifier PPG-AEMA was added via stream 6 and 7. Comp. Example 13—the rheology modifier PPG-AEMA was added via stream 6. Comp. Example 16—the rheology modifier PPG-AEMA was added via stream 6 and 7. Additional information can be found in Tables 6 and 7.

Comparative Examples 7, 10 and 14

The polymerization was carried out in tubular reactor with three reaction zones. See FIG. 8. This configuration leads to the lowest ratios of CTA concentration in the front ethylene-based feed versus the concentrations of CTA in sequential ethylene-based feed streams. In each reaction zone, the polymerization was initiated with organic peroxides as in Table 5. After reaching the first peak temperature in reaction zone 1, the reaction medium was cooled down with pressurized water. At the outlet of the first reaction zone, the reaction medium was further cooled by injecting a cold ethylene-rich feed stream (#20), and the reaction was initiated again, by feeding an organic peroxide system into the reaction zone. This process was repeated at the end of the second reaction zone, to enable further polymerization in the third reaction zone. The weight ratio of the ethylene-rich feed streams to the three reaction zones was 1.00:0.60:0.40. For the chain transfer agent, propionaldehyde (PA) was used, and it was present in each reactor inlet, originating from the low and high pressure recycle flows (#13 and #15), as well as from injected CTA make-up stream #23. The make-up ethylene is fed through stream #1. Comp. Example 14—the rheology modifier PPG-AEMA was added via stream 6 and 7. Inv. Example 10—propionaldehyde was added via streams #6 and #7, and TRIGONOX 301 was used in reaction zone 1 and 2. See also Tables 6-9.

Comparative Example 15

The polymerization was carried out in tubular reactor with three reaction zones. See FIG. 6. This configuration leads to the highest ratios of CTA concentration in the front ethylene-based feed versus the concentrations of CTA in sequential ethylene-based feed streams. In each reaction zone, the polymerization was initiated with organic peroxides as described in Comparative Example 3. After reaching the first peak temperature in reaction zone 1, the reaction medium was cooled down with pressurized water. At the outlet of the first reaction zone, the reaction medium was further cooled by injecting a cold ethylene-rich feed stream, and the reaction was initiated again, by feeding an organic peroxide system into the reaction zone.

This process was repeated at the end of the second reaction zone, to enable further polymerization in the third reaction zone. The weight ratio of the ethylene-rich feed streams to the three reaction zones was 1.00:0.60:0.40. For the chain transfer agent, propionaldehyde (PA) was used, and it was present in each reactor inlet, originating from the low and high pressure recycle flows (#13 and #15), as well as from injected CTA make-up stream #6 and #7. The make-up ethylene is fed through stream #1. The rheology modifier agent PPG-AEMA was added in stream #5 shortly after propionaldehyde was added via stream #7. Additional information can be found in Tables 6 to 9.

Comparative Examples 3-16 show the following. The results of the isobutane as CTA, with reduced CTA-activity at the inlet of the reactor and/or in the first reaction zone, versus using propylene as the CTA, show the importance of reducing the CTA-activity at the inlet of the reactor and/or in the first reaction zone over the CTA-activity in subsequent reaction zones. Replacing isobutane with propylene resulted in lower polymer densities, higher extractable levels and less effective use of the rheology modifier, as shown by a higher consumption rate of the rheology modifier. Using PA (propionaldehyde), as the CTA, and increasing its concentration and activity to the subsequent reaction zones, led to an effective use (high G' value, and/or, in general, low consumption of the modifier) of the rheology modifier, and a product with a high G' value. In a few comparative examples PPG-AEMA was used to increase G' by forming intermolecular H-branches. The comparative examples made at high G' and polymer densities below 0.9190 g/cm3 show hexane-extractable-levels of 3.0 wt-% or higher. The polymers made at higher densities show lower extractables. The Inventive Example 10 shows hexane-extractable level below 3.0% at a density below 0.9190 g/cc, at high G'.

Derivation of Correlations for Predicting G', Density and Hexane-Extractables

Empirical models are derived, valid for polymers of the type defined here, based on key outputs from the process simulations and based on measured polymer properties. The models are derived with linear regression using commercial software JMP®PRO version 11.1.1. Density is modeled with the following equation: Density [g/cc]=0.9498−(0.000997*$SCB_{freq}$[$1/1000C$])−(0.000529*$LCB_{freq}$[$1/1000C$])+(0.002587*log MI [dg/min]) Eqn. G. The density calculated by Eqn. G is representative of the actual measured density in the respective polymer sample. Based on the samples CE3-CE16 and IE10, this model has a correlation coefficient $R^2$ of 0.959. The predicted density, and some measured densities, is given in Table 8.

The G' (at G"=500 Pa, 170° C.) is modeled with the following equation: G' (at G"=500 Pa, 170° C.) ([Pa]=10^(1.9635−(0.2670*log MI [dg/min])+(0.07410*$LCB_{freq}$ [$1/1000C$])−(0.1639*Z1/Zi)+(1.347*Simulated H-branch level [$1/1000C$])−(0.0224*log Cs)) Eqn. H. The G' value calculated by Equation H is representative of the actual measured G' value in the respective polymer sample. Based on the samples CE3-CE16 and IE10, this model (in the log G' form) has a correlation coefficient $R^2$ of 0.963. The predicted G' (at G"=500 Pa, 170 C) is given in Table 8 for all samples, including those samples where measured G' is available.

Hexane extractable is modeled with the following equation: Hexane extractable [wt %]=0.38+(0.1488*Maximum $SCB_{freq}$ in last Rx-zone [$1/1000C$])−(0.0503*Minimum Chain segment length in last Rx-zone) Eqn. I. The hexane extractable level calculated by Equation I is representative of the actual measured hexane level in the respective polymer sample. Based on the samples CE3-CE16 and IE10, this model has a correlation coefficient $R^2$ of 0.862. The predicted hexane extractable is given in Table 9 for all samples, including those samples where measured hexane extractable is available. The model is based on simulation results in the last process zone. Apparent hexane extractable for each reactor zone i is provided by applying the same equation with the same inputs, but now selected in that same reactor zone i. Apparent Hexane extractable (zone k)=0.38+(0.1488*Maximum SCB level in Rx-zone k)−(0.0503*Minimum Chain segment length in Rx-zone k) Eqn. J.

Study 2: Simulation Exs.—Flow Diagrams and CTA and/or Polyene Feed Distributions Other than mentioned in the description of the flow diagrams in FIGS. 1, 2 and 3, described below, the polyene feed can optionally be freely distributed over the main compression streams fed to and/or distributed over the side streams (20) and/or (21) and/or front stream (9). Polyene streams (6) can be fed in the inlet(s), interstage(s), outlet(s) of the Hyper and/or directly into the reaction zones. Furthermore the polyene can be optionally dosed at the inlet, outlet or interstages of the Primary and/or Booster compressors systems.

Description of Flow Diagram Used for Comparative Example 1 and 2 and Inventive 9

FIG. 1 shows flow scheme of a simulated high pressure polymerization plant configuration containing a tubular reactor with an ethylene feed distribution of 100/0/0/0. Stream (1) is the ethylene make-up, which is compressed together with the outlet of the Booster by the Primary to stream (2). Stream (2) is combined with high pressure recycle stream (18) and fed to the inlet of the "Hyper." The Hyper pressurizes the ethylene feed stream to a level sufficient to feed the high pressure tubular reactor (Reactor). Stream (4) depicts the CTA system make-up feed. CTA make-up streams (4) can be fed in the inlet(s), interstage(s), outlet(s) of the Hyper and/or inlet(s) of the reaction zones. Furthermore the CTA can be optionally dosed at the inlet, outlet or interstages of the Primary and/or Booster compressors. The CTA system can consist of single and/or multiple components and includes varying compositions. Stream (6) depicts the polyene feed. The discharge temperature of the Hyper is typically in the range of 60 to 100° C. The ethylene feed to the first reaction zone is typically preheated to a temperature in the range of 130 to 180° C., while the ethylene of the side feed is fed to the reactor at the Hyper discharge temperature or cooled prior to feeding to the reactor. The reactor dimensions and configuration are given in Table 6. After finishing the reaction, and having applied multiple cooling steps, the reaction mixture is depressurized and/or cooled in (10), and separated as discussed above.

Description of Flow Diagram Used for Inventive 1 and 2

FIG. 2 shows the flow scheme of the high pressure polymerization process with a tubular reactor, used to produce Inv. Exs. 1 and 2. Stream (1), ethylene make-up is compressed together with the outlet of the Booster by Primary compressor system resulting in flows (2) and (3). Stream (2) and (3) are combined with the high pressure recycle stream (18) and fed through line (19) and (5) to the Hyper compressor part feeding the front (9) of the Reactor. The Hyper compressor part feeding the side stream (8) receives ethylene feed through line (4). The ethylene supplied by line (8) is distributed through line (20) and (21) to the side of the reactor. Line (4) receives ethylene feed from line (18). The CTA is fed through line (22) to the suction of Primary A. The Hyper pressurizes the ethylene feed streams to a level sufficient to feed the high pressure tubular reactor (Reactor). Stream (6) and/or stream (7) depict the polyene feed. After finishing the reaction, and having applied multiple cooling steps, the reaction mixture is depressurized and/or cooled in (10), and separated as discussed above. See Table 6.

Description of Flow Diagram Used for Inventive 3 to 6

FIG. 3 shows the flow scheme of the high pressure polymerization process with a tubular reactor, used to produce Inv. Exs. 3 to 6. Stream (1), ethylene make-up is compressed together with the outlet of the Booster by Primary compressor system resulting in flow (2). Stream (2) is fed together with the ethylene from the high pressure recycle stream (18) through lines (19), (5) and (4) to the Hyper compressor parts compressing respectively the front stream (9) and the sides streams (20) and (21) of the Reactor. Stream (6) depicts the polyene feed. The CTA is fed through line (7) to the Booster. Optionally the CTA can be fed to the inlet, inter-stages or outlet of the Primary or in line (18). Information about the Reactor system can be found Table 7. In the Reactor, the polymerization is initiated with the help of free radical initiation systems, injected and/or activated at the inlet of each reaction zone. The maximum temperature in each reaction zone is controlled at a set point by regulating the concentration and/or feed amount of initiation system at the start of each reaction zone. After finishing the reaction, and having applied multiple cooling steps, the reaction mixture is depressurized and/or cooled in (10), and separated as discussed above.

Description of Flow Diagram Used for Inventive 7

Figure 4:
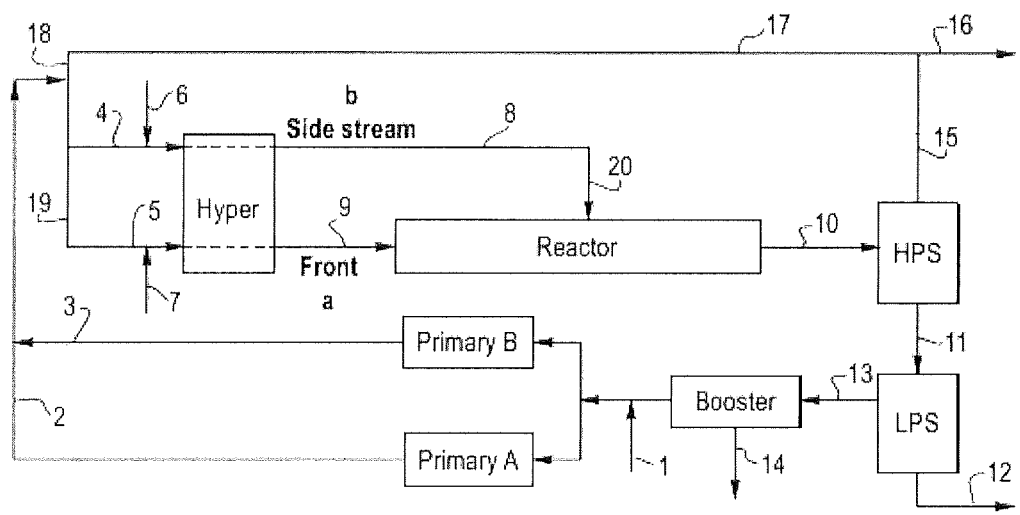
FIG. 4 is a flow diagram for Inv. Ex. 7.

FIG. 4 shows the flow scheme of the high pressure polymerization process with a tubular reactor, used to produce Inv. Ex. 7. Stream (1), ethylene make-up is compressed together with the outlet of the Booster by Primary compressor system resulting in flows (2) and (3). Stream (2) and (3) are combined with the high pressure recycle stream (18) and fed through line (19) and (5) to the Hyper compressor part feeding the front (9) of the Reactor. The Hyper compressor part feeding the side stream (8) receives ethylene feed through line (4). The ethylene supplied by line (8) is fed through line (20) to the side of the reactor. Line (4) receives ethylene feed from line (18). The Hyper pressurizes the ethylene feed streams to a level sufficient to feed the high pressure tubular reactor (Reactor). Stream (6) and/or stream (7) depict the CTA feed. See Table 7. After finishing the reaction, and applying multiple cooling steps, the reaction mixture is depressurized and/or cooled in (10), and separated as discussed above.

Description of Flow Diagram Used for Inventive 8

Figure 5:
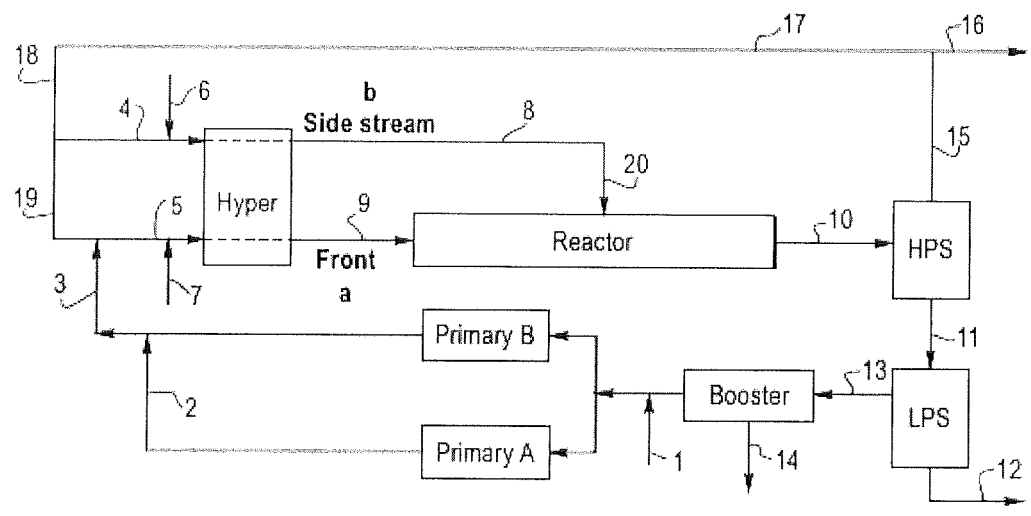
FIG. 5 is a flow diagram for Inv. Ex. 8.

FIG. 5 shows the flow scheme of the high pressure polymerization process with a tubular reactor, used to produce Inv. Ex. 8. Stream (1), ethylene make-up is compressed together with the outlet of the Booster by Primary compressor system resulting in flow (2) and (3). Stream (2) and (3) are combined with high pressure recycle stream (19) and fed through line 5 to the Hyper compressor part feeding the front (9) of the Reactor. The Hyper compressor part feeding the side stream (8) receives ethylene feed through line (4). The ethylene supplied by line (8) is fed through line (20) to the side of the reactor. Line (4) receives ethylene feed from line (18). The Hyper pressurizes the ethylene feed streams to a level sufficient to feed the high pressure tubular reactor (Reactor). Stream (6) and/or stream (7) depict the CTA feed line. After finishing the reaction, and having applied multiple cooling steps, the reaction mixture is depressurized and/or cooled in (10), and separated as discussed above.

General Polymerization Conditions Used in Comp. 1 and 2 and Inv. 1-9 Polymerizations In all comparative and inventive polymerizations the CTA concentration has been adjusted to achieve a product with a melt index ($I_2$) described in Table 6. Variation in product melt-index is possible by lowering or increasing CTA concentration. The maximum temperature in each reaction zone is controlled at a set point by regulating the concentration and/or feed amount of initiation system at the start of each reaction zone.

General Strategy Used in Inventive 1-10 Polymerizations

To have a coatable product following strategy was applied: operate the $1^{st}$ reaction zone at high temperatures above 320 and the last peak temperature below 290° C. to control extractables. Operate the middle reaction zone(s) in-between $1^{st}$ and last reaction zone. To achieve acceptable G'-values rheology modifier agent(s) (polyenes and/or mCTAs) might be used. Table 6 shows the reactor configuration (i.e., dimensions, lay-out, applied ethylene feed distribution) used for the simulated comp. and inv. polymerizations. The type and distribution of polyenes are shown in Table 8. The feed distributions show the percent of total ethylene or polyene feed stream fed to each reaction zone. The notation "100/0/0/0" means that all the total ethylene or polyene feed is fed to the first reaction zone, while no feed streams are fed to the second, third and fourth reaction zones. The ethylene or polyene received in the second, third and fourth reaction zones are carry-over from the previous reaction zones. As an example, the notation "50/38/12" means that 50% of the total ethylene or polyene feed is fed to the first reaction zones, 38% of the total ethylene or polyene feed is fed to the second reaction zone and 12% of the total ethylene or polyene feed is fed to the third reaction zone. Further columns in Table 6 and 7 give information on pressure level and initiation temperatures of all reaction zones, the ethylene feed temperature when a side ethylene feed stream is applied, and the maximum or peak temperatures in each reaction zone (Rx). The ethylene feed temperature can be optionally lowered and/or controlled with a cooler.

The polymerization simulations for Comp. Exs. 1 and 2 are based on the Inv. Exs. I and II of U.S. Pub. No. 2008/0242809. As CTA, propylene was used, and to increase G', BDMA was added (see Table 4). All reactants are fed to the front. The initiator systems were: Rx-zone 1 (TBPO/DTBP), Rx-zone 2 (DTBP), Rx-zone 3 (DTBP); Rx-zone 4 (DTBP). The main differences are the peak temperatures and the amount of BDMA fed (indicated by different H-branch level) (see Table 7 and 8). The usage of BDMA will create H-branches. To predict G', it is assumed that the H-branches by BDMA will increase G' similar to PPG-AEMA used in Comp. Exs. 12 to 16. The predicted product properties—see Tables 8-9. G'-value can be further controlled by increasing and decreasing the BDMA concentration.

Inv. Exs. 1 and 2 are made at the similar process conditions described in Table 6 and 7. Inv. Ex. 1 is a 4 MI product and Inv. Ex. 2 is a 10 MI product. To keep the Inv. Ex. 2 below the extractable limit of 2.6, the $3^{rd}$ peak temp. is lowered 5° C. To achieve an acceptable G'-level, BDMA is added in the $2^{nd}$ reaction zone which gives H-branches. The initiator system was: Rx-zone 1 (TBPO/DTBP/Tx-301), Rx-zone 2 (TBPO/DTBP), Rx-zone 3 (DTBP). Inv. Ex. 3 is made in a 5-reaction zone configuration. The first two peak temperatures are operated at 338° C. These high peak temperatures allow to operate without any rheology modifier agent, but still achieve acceptable G'. The following initiator system was: Rx-zone 1 (TBPO/DTBP/Tx-301), Rx-zone 2 (TBPO/DTBP/Tx-301), Rx-zone 3 (TBPO/DTBP), Rx-zone 4 (DTBP), Rx-zone 5 (DTBP). Inv. Exs. 4 and 6 are made at the similar process conditions described in Tables 6 and 7. Inv. Ex. 4 is a 4 I2 product and Inv. Ex. 6 is a 10 I2 product. To keep the Inv. Ex. 4 below the extractable limit of 2.6, the last peak temperature is lowered by 5° C. To achieve an acceptable G' level, BDMA is added in the 3rd reaction zone which gives H-branches. The same initiator system is used as in Inv. Ex. 3. Inv. 5 is made with a mCTA 6 as rheology modifier agent, instead of using BDMA as in Inv. 4 (see Table 4). The mCTA generates T-branches instead of H-branches, and T-branches are less effective than H-branches. For the G'-prediction they are treated as LCB. To achieve an acceptable G'-level, a higher level of T-branch is needed compared to a polyene. Due to the low reactivity of the CTA-functionality of the mCTA, it is fed already in the $2^{nd}$ reaction zone, which increases the conversion level to T-branches, as compared to feeding in the $3^{rd}$ reaction zone. Inv. Exs. 7 and 8 are made in 4 reaction zone configuration without using any rheology modifier agent. The reactor inlet pressure varies with 100 bar, but the main difference is the CTA system distribution. In Inv. Ex. 7, the CTA system is evenly distributed (Z1/Zi=1). In Inv. Ex. 8, the CTA system is distributed more to the side (Z1/Zi=0.67). The other process conditions are similar. The initiator system was: Rx-zone 1 (TBPO/DTBP/Tx-301), Rx-zone 2 (DTBP/Tx-301), Rx-zone 3 (DTBP), Rx-zone 4 (DTBP). Due to the CTA system distribution, the predicted G' for Inv. Ex. 8 is higher than Inv. Ex. 7. For Inv. Ex. 9, the initiator system was: Rx-zone 1 (TBPO/DTBP/Tx-301), Rx-zone 2 (DTBP), Rx-zone 3 (DTBP), Rx-zone 4 (DTBP). To achieve acceptable G' value BDMA is led to 3rd reaction zone. See Tables 6-9.

For the polymerization simulations for Comp. Exs. 1 and 2, high G'-values, and high hexane-extractable-levels from 3.0 to 3.7, resulted as shown in Tables 8 and 9, which is in line with the commercial Sabic nExcoat 5 product. Table 10 lists tubular extrusion products and some typical autoclave extrusion products. All products have high G' values; however the autoclave products have significant lower hexane extractable values (3.3 to 4.8 wt % (tubular) versus <2 wt % (autoclave)). Autoclave resins have lower hexane extractables due to the low maximum polymerization temperatures applied in the autoclave process. High G' values can be achieved in these processes at low maximum polymerization temperatures, due to back mixing in the autoclave reaction zones. These products are very suitable for cook-in applications (hexane extractable level <2.6 wt %) requiring high melt strength. However, in autoclave reactors, typically, the ethylene conversion rate is <20%, as compared to a tubular reactor (typically >30%). Surprisingly it has been found in the Inventive Examples 1 to 10, with a density <0.9190 g/cc, have hexane-extractable-levels <3.0 wt %, and high G' levels. Even more surprisingly, it has been found that the hexane-extractable-level can be reduced below 2.6 wt %, thus meeting the critical FDA cook-in-limit.

TABLE 6

Reactor Config., Feed Modes, Process and CTA Cond. for Comp. and Inv. Polymerizations

| Ex. | Ethylene feed distribution % | # of Rx-zones | Inlet Press.Bar | Press drop (ΔP) Bar | 12 dg/min | CTA | Cs at 1360 atm and 130° C. | CTA distr. Z1/Zi |
|---|---|---|---|---|---|---|---|---|
| CE3 to 16 + IE10: tube i.d. (40/60/60 mm); Rx-zn length (distrib): 1410 m (400/470/540 m); thru-put ca. 55000 kg/hr. ||||||||
| CE3 | 50/38/12 | 3 | 2100 | 261 | 3.5 | Acetone | 0.0168 | 0.86 |
| CE4 | 50/38/12 | 3 | 2100 | 260 | 5 | Acetone | 0.0168 | 0.86 |
| CE5 | 50/38/12 | 3 | 2100 | 254 | 5.2 | C3= | 0.0122 | 0.86 |
| CE6 | 50/40/10 | 3 | 2155 | 275 | 4.28 | C3= | 0.0122 | 1.14 |
| CE7 | 50/30/20 | 3 | 2140 | 264 | 4.14 | PA | 0.33 | 0.71 |
| CE8 | 50/38/12 | 3 | 2100 | 273 | 2 | Acetone | 0.0168 | 0.86 |
| CE9 | 50/34/16 | 3 | 2100 | 260 | 7.4 | PA | 0.33 | 0.92 |
| CE10 | 50/34/16 | 3 | 2100 | 260 | 7.1 | PA | 0.33 | 1.2 |
| CE11 | 50/40/10 | 3 | 7270 | 284 | 4 | isobutane | 0.0072 | 1.14 |
| CE12 | 50/40/10 | 3 | 2220 | 284 | 3.9 | isobutane | 0.0072 | 1.14 |
| CE13 | 50/40/10 | 3 | 2220 | 285 | 3.7 | isobutane | 0.0072 | 1.14 |
| CE14 | 50/30/20 | 3 | 2140 | 306 | 3.8 | PA | 0.33 | 0.71 |
| CE15 | 50/30/20 | 3 | 2140 | 279 | 3.8 | PA | 0.33 | 1.37 |
| CE16 | 50/40/10 | 3 | 2155 | 310 | 4.1 | C3= | 0.0122 | 1.14 |
| IE10 | 50/38/12 | 3 | 2078 | 295 | 0.75 | PA | 0.33 | 0.89 |
| CE1 and 2: tube i.d. (54/54/54/54 mm), Rx-zn length (distrib): 1500 m (450/350/400/300 m); thru-put ca. 60000 kg/hr. ||||||||
| CE1 | 100/0/0/0 | 4 | 2500 | 500 | 4 | C3= | 0.0122 | 1 |
| CE2 | 100/0/0/0 | 4 | 2500 | 505 | 4 | C3= | 0.0122 | 1 |
| IE 1 and 2: tube i.d. (40/60/60 mm); Rx-zone length (distrib): 1410 m (400/470/540 m); thu-put ca. 55000 kg/hr ||||||||
| IE1 | 50/40/10 | 3 | 2100 | 285 | 4 | C3= | 0.0122 | 1 |
| IE2 | 50/40/10 | 3 | 2100 | 273 | 10 | C3= | 0.0122 | 1 |
| IE3 to 6: tube i.d. (35/50/60/60/60 mm); Rx-zn length (distrib): 1800 m (200/300/500/400/400 m); thru-put ca. 60000 kg/hr ||||||||
| IE3 | 25/25/50/0/0 | 5 | 2400 | 383 | 4 | C3= | 0.0122 | 1 |
| IE4 | 25/25/50/0/0 | 5 | 2300 | 380 | 4 | C3= | 0.0122 | 1 |
| IE5 | 25/25/50/0/0 | 5 | 2300 | 384 | 4 | C3= | 0.0122 | 1 |
| IE6 | 25/25/50/0/0 | 5 | 2300 | 380 | 10 | C3= | 0.0122 | 1 |
| IE7 and 8: inside tube diameter (50/60/60/60 mm), Rx-zn length (distrib): 1500 m (300/400/400/400 m): thru-put 60000 kg/hr ||||||||
| IE7 | 65/35/0/0 | 4 | 2300 | 345 | 4 | C3= | 0.0122 | 1 |
| IE8 | 65/35/0/0 | 4 | 2400 | 334 | 4 | C3= | 0.0122 | 0.67 |
| IE9: tube i.d. (62/62/62/62 mm), Rx-zone length (distribution): 1500 m (450/350/400/300 m); thru-put ca. 60000 kg/hr ||||||||
| IE9 | 100/0/0/0 | 4 | 2200 | 296 | 4 | C3= | 0.0122 | 1 |

Note:
C3= is propylene

TABLE 7

Reactor Temps, Conv. and Sim. Conv. and Polymer Branching for Comp. and Inv. Polymerizations

| Ex. | Peak temp ° C. | (Re)initiation temp ° C. | Side stream(s) temp ° C. | Ethylene conversion meas. % | Ethylene conversion simul. % | Simul. LCB #/1000C | Simul. SCB #/1000C |
|---|---|---|---|---|---|---|---|
| CE3 | 330/321/310 | 140/154/233 | 61 | 31.8 | 32.3 | 5.33 | 28.7 |
| CE4 | 337/330/310 | 140/157/244 | 62 | 32.4 | 33.2 | 5.72 | 29.3 |
| CE5 | 330/319/306 | 140/151/231 | 62 | 31.8 | 32.2 | 5.23 | 31.4 |
| CE6 | 293/293/294 | 146/148/220 | 68 | 28.2 | 28.0 | 3.67 | 29.5 |
| CE7 | 292/294/294 | 145/159/197 | 56 | 28.4 | 28.4 | 3.74 | 25.5 |
| CE8 | 331/326/311 | 140/154/238 | 62 | 33.4 | 32.4 | 5.47 | 28.9 |
| CE9 | 325/319/296 | 140/149/209 | 62 | 30.4 | 32.2 | 4.97 | 27.6 |
| CE10 | 324/318/294 | 140/147/209 | 62 | 32.1 | 32.1 | 4.9 | 27.6 |
| CE11 | 293/293/293 | 145/152/196 | 60 | 27.7 | 27.5 | 3.74 | 26.5 |
| CE12 | 293/293/293 | 144/148/211 | 60 | 27.5 | 27.4 | 3.62 | 25.7 |
| CE13 | 294/293/294 | 140/148/213 | 59 | 27.5 | 27.6 | 3.66 | 25.8 |
| CE14 | 293/293/293 | 145/160/199 | 56 | 28.3 | 28 | 3.64 | 25.1 |
| CE15 | 293/293/293 | 145/151/198 | 56 | 28.2 | 28.1 | 3.56 | 24.8 |
| CE16 | 293/293/294 | 145/148/217 | 65 | 27.5 | 28 | 3.67 | 25.5 |
| IE10 | 331/326/300 | 140/160/248 | 58 | 29.2 | 30 | 5.03 | 28.5 |
| CE1 | 300/300/300/300 | 140/255/255/254 | none | | 33.6 | 4.32 | 29.0 |
| CE2 | 310/310/310/310 | 140/260/264/263 | none | | 35.7 | 5.04 | 29.6 |
| IE1 | 338/307/285 | 145/149/223 | 65 | | 30.1 | 4.46 | 31.13 |
| IE2 | 338/307/280 | 145/148/222 | 65 | | 30.2 | 4.42 | 32.4 |
| IE3 | 338/338/315/292/279 | 150/172/199/263/259 | 80 | | 35.9 | 5.36 | 29.8 |
| IE4 | 335/335/300/290/277 | 150/169/201/252/256 | 80 | | 34.8 | 5.22 | 30.0 |
| IE5 | 338/310/310/295/278 | 150/169/199/258/259 | 80 | | 34.8 | 5.12 | 29.9 |
| IE6 | 335/335/300/288/272 | 150/167/195/249/250 | 80 | | 35.3 | 5.25 | 31.0 |
| IE7 | 338/330/300/282 | 140/241/271/259 | 80 | | 35 | 5.23 | 30.2 |
| IE8 | 338/330/300/282 | 140/246/271/258 | 80 | | 34.8 | 5.23 | 30.1 |
| IE9 | 338/323/298/279 | 140/264/269/255 | 80 | | 34.7 | 5.21 | 30.7 |

TABLE 8

Branching Agent Conditions and Measured and Predicted Density and G' for Polymers

| Case # | BA agent | BA distrib. wt % | Simul. H- or T-branch #/1000C | Density quick meas. g/cc | Density quick predicted Eqn Gg/cc | G' meas. Pa | G' predicted Eqn H Pa | G' limit Eqn Pa |
|---|---|---|---|---|---|---|---|---|
| CE3 | none | none | 0.0 | 0.9196 | 0.9198 | 126 | 129 | 117 |
| CE4 | none | none | 0.0 | 0.9188 | 0.9194 | 132 | 126 | 108 |
| CE5 | none | none | 0.0 | 0.9177 | 0.9176 | 113 | 115 | 107 |
| CE6 | none | none | 0.0 | 0.9195 | 0.9201 | 79 | 84 | 112 |
| CE7 | none | none | 0.0 | 0.9246 | 0.9240 | 99 | 93 | 113 |
| CE8 | none | none | 0.0 | 0.9193 | 0.9189 | 153 | 154 | 132 |
| CE9 | none | none | 0.0 | 0.922 | 0.9219 | 89 | 91 | 98 |
| CE10 | none | none | 0.0 | 0.9221 | 0.9219 | 83 | 82 | 99 |
| CE11 | none | none | 0.0 | 0.9235 | 0.9230 | 89 | 88 | 114 |
| CE12 | PPG-AEMA | 62/30/8 | 0.117 | 0.9229 | 0.9238 | 137 | 124 | 115 |
| CE13 | PPG-AEMA | 0/80/20 | 0.085 | 0.9234 | 0.9236 | 112 | 114 | 116 |
| CE14 | PPG-AEMA | 13/52/35 | 0.097 | 0.9251 | 0.9243 | 192 | 127 | 115 |
| CE15 | PPG-AEMA | 100/0/0 | 0.137 | 0.9240 | 0.9247 | 111 | 111 | 115 |
| CE16 | PPG-AEMA | 65/29/7 | 0.138 | 0.9194 | 0.919 | 124 | 130 | 113 |
| IE10 | none | none | 0.0 | 0.9183 | 0.9184 | 172 | 172 | 157 |
| CE1 | BDMA | 100/0/0/0 | 0.10 | | 0.9202 | | 137 | 114 |
| CE2 | BDMA | 100/0/0/0 | 0.06 | | 0.9192 | | 137 | 114 |
| IE1 | BDMA | 0/100/0 | 0.06 | | 0.9190 | | 124 | 114 |
| IE2 | BDMA | 0/100/0 | 0.08 | | 0.9177 | | 103 | 90 |
| IE3 | none | none | 0.0 | | 0.9188 | | 120 | 114 |
| IE4 | PPG-AEMA | 0/0/100/0/0 | 0.05 | | 0.9187 | | 137 | 114 |
| IE5 | Monom. CTA | 0/100/0/0/0 | (0.5)[1] | | 0.9186 | | 125 | 114 |
| IE6 | PPG-AEMA | 0/0/100/0/0 | 0.04 | | 0.9187 | | 104 | 90 |
| IE7 | none | none | 0.0 | | 0.9185 | | 117 | 114 |
| IE8 | none | none | 0.0 | | 0.9186 | | 133 | 114 |
| IE9 | BDMA | 0/0/100/0 | 0.03 | | 0.9180 | | 128 | 114 |

Note 1:
In this case of pure T-branching, the H-branch level in the model prediction for G' is set to zero, and the LCB simulation is augmented by 0.5 in the G' and density model prediction.

TABLE 9

| Ex. | Max. SCB$_{freq}$ in RX-zone (i-2)/(i-1)/(i) #/1000C | Min. CSL (Chain Segm. Length) level in RX-zone (i-2)/(i-1)/(i) C atoms | Hexane extr. meas. wt % | Apparent in (i-2) Rx-zoneEqn J wt % | Apparent in (i-1) Rx-zoneEqn J wt % | Predicted from i$^{th}$ Rx-zoneEqn I wt % | Hexane extr. limitEqn wt % |
|---|---|---|---|---|---|---|---|
| CE3  | 34.2/37.7/38.9 | 129.1/78.9/62.2   | 3    | <0.5 | 2.03 | 3.05 | 2.79 |
| CE4  | 36.2/39.3/39.3 | 117.6/70.1/60.0   | 3.8  | <0.5 | 2.71 | 3.22 | 2.82 |
| CE5  | 38.1/41.0/42.1 | 125.2/78.0/62.8   | 3.5  | <0.5 | 2.56 | 3.49 | 2.83 |
| CE6  | 34.2/36.5/39.3 | 199.7/120.6/83.9  | 2.1  | <0.5 | <0.5 | 2.01 | 2.81 |
| CE7  | 28.9/32.3/34.9 | 224.6/121.3/84.7  | 1.3  | <0.5 | <0.5 | 1.32 | 2.80 |
| CE8  | 35.2/38.5/39   | 129.2/75.1/62.1   | 3    | <0.5 | 2.34 | 3.07 | 2.73 |
| CE9  | 34.2/37.4/36.7 | 136.9/74.8/69.3   | 1.9  | <0.5 | 2.01 | 2.36 | 2.87 |
| CE10 | 34.2/37.2/36.5 | 136.6/79.4/70.6   | 1.8  | <0.5 | 1.93 | 2.27 | 2.86 |
| CE11 | 30.4/32.4/36.3 | 197.1/129.2/83.1  | 1.4  | <0.5 | <0.5 | 1.61 | 2.80 |
| CE12 | 30.3/32.7/36.3 | 203.5/127.7/84.0  | 1.7  | <0.5 | <0.5 | 1.56 | 2.80 |
| CE13 | 30.5/32.7/36.5 | 197.2/127.1/82.3  | 1.5  | <0.5 | <0.5 | 1.68 | 2.79 |
| CE14 | 28.7/31.3/33.9 | 222.1/128.6/89.2  | 1.3  | <0.5 | <0.5 | 0.94 | 2.79 |
| CE15 | 28.6/31.2/33.4 | 214.4/128.8/92.1  |      | <0.5 | <0.5 | 0.72 | 2.79 |
| CE16 | 34.2/36.2/40.1 | 199.8/127.5/83.2  | 2.1  | <0.5 | <0.5 | 2.26 | 2.80 |
| IE10 | 35.3/38.5/36.5 | 128.3/76.0/75.3   | 2.5  | <0.5 | 2.29 | 2.03 | 2.62 |
| CE1  | 33.5/36.4/39.9 | 139.6/95.6/67.1   |      | <0.5 | 0.99 | 2.95 | 2.80 |
| CE2  | 34.4/37.6/41.5 | 120.2/81.9/57.2   |      | <0.5 | 1.86 | 3.68 | 2.80 |
| IE1  | 40.5/39.9/39.4 | 114.6/89.6/80.0   |      | 0.65 | 1.82 | 2.23 | 2.80 |
| IE2  | 42.9/41.0/40.6 | 109.4/89.4/78.8   |      | 1.27 | 1.99 | 2.46 | 2.90 |
| IE3  | 36.9/37.0/37.5 | 102.6/81.8/73.5   |      | 0.72 | 1.78 | 2.27 | 2.80 |
| IE4  | 35.6/36.4/36.5 | 100.0/81.2/75.0   |      | 0.65 | 1.72 | 2.05 | 2.80 |
| IE5  | 37.0/37.9/37.7 | 94.7/78.0/72.7    |      | 1.13 | 2.10 | 2.34 | 2.80 |
| IE6  | 37.0/38.3/38.3 | 98.3/79.6/73.7    |      | 0.95 | 2.08 | 2.38 | 2.90 |
| IE7  | 38.7/37.3/37.2 | 83.4/78.5/72.5    |      | 1.95 | 1.99 | 2.28 | 2.80 |
| IE8  | 38.9/37.5/37.4 | 83.4/78.7/72.3    |      | 1.98 | 2.01 | 2.31 | 2.80 |
| IE9  | 38.6/37.6/37.2 | 83.3/77.0/72.3    |      | 1.94 | 2.11 | 2.29 | 2.80 |

TABLE 10

Comparative Extrusion Coating Resins

|  |  | MI dg/min | Density g/cc | G' (G" = 500 Pa; 170 C.) Pa | Hexane Ex.* wt % | Density g/cc | G' (G' = 500 Pa; 170 C.) Pa | Hexane Ex.* wt % |
|---|---|---|---|---|---|---|---|---|
| Dow PG7004       | AC***  | 4.1 | 0.9215 | 146 | <2.0 | <0.9190 | 113 | 2.8 |
| Dow PT7007       | AC     | 7.5 | 0.9174 | 129 | 1.9  | <0.9190 | 97  | 2.9 |
| Dow LDPE 160C    | Tube** | 6.4 | 0.9175 | 110 | 4.8  | <0.9190 | 102 | 2.9 |
| Sabic nExcoat 5  | Tube   | 4.6 | 0.9170 | 149 | 3.3  | <0.9190 | 110 | 2.8 |
| Borealis CT7200  | Tube   | 4.7 | 0.9189 | 128 | 4.1  | <0.9190 | 110 | 2.8 |
| Dow Agility EC7000 | Tube | 3.9 | 0.9188 | 140 | 3.4  | <0.9190 | 115 | 2.8 |

*Hexane Extract Level.
**Tubular reactor.
***Autoclave reactor.

What is claimed is:

1. An LDPE homopolymer formed from a free-radical, high pressure polymerization process that includes a reactor configuration comprising, as reactors, only one or more tubular reactors, said homopolymer comprising the following properties:
   (A) a density less than 0.9190 g/cc;
   (B) a hexane extractable level that meets the following equation: hexane extractable level ≤A+B[log (I2)], where A=2.65 wt %, and B=0.25 wt %/[log(dg/min)]; based on total weight of the ethylene-based polymer;
   (C) a G' (at G"=500 Pa, 170° C.) that meets the following equation: G' C+D[log (I2)], where C=150 Pa, and D=−60 Pa/[log(dg/min)]; and
   (D) a melt index (I2) from 0.7 to 20 dg/min.

2. A process for producing an ethylene-based polymer, the process comprising polymerizing a reaction mixture comprising ethylene in a reaction configuration comprising a first tubular reaction zone 1 and a last tubular reaction zone i, in which i is greater than or equal to (≥) 4, under high pressure polymerization conditions, and in which the first reaction zone 1 has a peak polymerization temperature of ≥320° C., and the last reaction zone i has a peak polymerization temperature of ≤290° C.

3. The process of claim 2 in which one or more polyene(s) are added to at least one reaction zone.

4. The process of claim 2 in which the peak polymerization temperature of reaction zone 1 is at least 30° C. greater than the peak polymerization temperature of reaction zone i.

5. The process of claim 2, wherein the ethylene-based polymer comprises from greater than, or equal to, 0.1 to less than, or equal to, 3.0 moles of "T-branches derived from the use of a monomeric chain transfer agent" per 1000 moles of carbon atoms incorporated into the ethylene-based polymer.

6. The process of claim 2, wherein the ethylene-based polymer comprises greater than, or equal to, 0.010 moles of "overall H-branches" per 1000 moles of carbon atoms incorporated into the polymer.

7. A process for producing an ethylene-based polymer, the process comprising polymerizing a reaction mixture comprising ethylene in a reaction configuration comprising a first tubular reaction zone 1 and a last tubular reaction zone i, in which i is greater than or equal to (≥) 3, in which one or more polyene(s) are added to at least one reaction zone, under high pressure polymerization conditions, and in which the first reaction zone 1 has a peak polymerization temperature of ≥320° C., and the last reaction zone i has a peak polymerization temperature of ≤290° C.

8. The process of claim 7 in which one or more monomeric CTA(s) are added to at least one reaction zone.

9. The process of claim 7 in which a mixture of monomeric CTA(s) and polyene(s) is added to at least one reaction zone.

10. The process of claim 7, the process further comprising one or more CTAs in which the CTA is an alkane, aldehyde, ketone, alcohol, ether, ester, mercaptan, phosphine or a combination of two or more thereof.

11. The process of claim 7 in which the peak polymerization temperature of reaction zone 1 is at least 30° C. greater than the peak polymerization temperature of reaction zone i.

12. The process of claim 7, wherein the ethylene-based polymer comprises from greater than, or equal to, 0.1 to less than, or equal to, 3.0 moles of "T-branches derived from the use of a monomeric chain transfer agent" per 1000 moles of carbon atoms incorporated into the ethylene-based polymer.

13. The process of claim 7, wherein the ethylene-based polymer comprises greater than, or equal to, 0.010 moles of "overall H-branches" per 1000 moles of carbon atoms incorporated into the polymer.

14. The process of claim 7, the process further comprising a total ethylene feed, wherein a concentration of the polyene in the total ethylene feed is less than 0.2 mole percent, based on a total moles of ethylene fed to the reactor.

15. A process for producing an ethylene-based polymer, the process comprising polymerizing a reaction mixture comprising ethylene in a reaction configuration comprising a first tubular reaction zone 1 and a last tubular reaction zone i, in which i is greater than or equal to (≥) 3, in which one or more polyene(s) and one or more monomeric CTA(s) are added to at least one reaction zone, under high pressure polymerization conditions, and in which the first reaction zone 1 has a peak polymerization temperature of ≥320° C., and the last reaction zone i has a peak polymerization temperature of ≤290° C.

16. The process of claim 15, the process further comprising a total ethylene feed, wherein a concentration of the polyene in the total ethylene feed is less than 0.2 mole percent, based on a total moles of ethylene fed to the reactor.

17. The process of claim 15 in which a mixture of monomeric CTA(s) and polyene(s) is added to at least one reaction zone.

18. The process of claim 15, comprising one or more CTAs that are not a monomeric CTA, wherein the CTA is an alkane, aldehyde, ketone, alcohol, ether, ester, mercaptan, phosphine or a combination of two or more thereof.

* * * * *